(12) United States Patent
Inagaki et al.

(10) Patent No.: US 8,279,282 B2
(45) Date of Patent: Oct. 2, 2012

(54) DISPLAY CONTROL APPARATUS, DISPLAY CONTROL METHOD, AND PROGRAM

(75) Inventors: Takeo Inagaki, Tokyo (JP); Gen Fujiki, Tokyo (JP); Miwako Fujiki, legal representative, Tokyo (JP)

(73) Assignee: Sony Corporation (JP)

( * ) Notice: Subject to any disclaimer, the term of this patent is extended or adjusted under 35 U.S.C. 154(b) by 395 days.

(21) Appl. No.: 12/586,444

(22) Filed: Sep. 22, 2009

(65) Prior Publication Data

US 2010/0073484 A1 Mar. 25, 2010

(30) Foreign Application Priority Data

Sep. 22, 2008 (JP) ................ P2008-243072

(51) Int. Cl.
*H04N 7/18* (2006.01)
*H04N 5/225* (2006.01)
*H04N 5/445* (2011.01)
(52) U.S. Cl. ......... 348/157; 348/169; 348/563; 348/564
(58) Field of Classification Search .................. 348/157, 348/169
See application file for complete search history.

(56) References Cited

U.S. PATENT DOCUMENTS

| 6,791,531 B1 * | 9/2004 | Johnston et al. ............... 345/157 |
| 2004/0032495 A1 * | 2/2004 | Ortiz ............................. 348/157 |
| 2008/0129825 A1 * | 6/2008 | DeAngelis et al. ........... 348/169 |

FOREIGN PATENT DOCUMENTS

| JP | 10-013811 A | 1/1998 |
| JP | 2003153250 A | 5/2003 |
| JP | 2003158710 A | 5/2003 |

OTHER PUBLICATIONS

Office Action from Japanese Application No. 2008-243072, dated Oct. 12, 2010.
Toshihiko Misu et al., Automatic generation of Meta data in a sports program, Data fusion to chase and identify a soccer player, Institute of Electronics, Information and Communication Engineers technology memoir, Japanese corporate judicial person Institute of Electronics, Information and Communication Engineers, Nov. 11, 2005, vol. 105, No. 415, p. 39-44.
Office Action from Japanese Application No. 2008-243072, dated Jun. 15, 2010.
Technical Report of IEICE, PRMU2003-214, "Estimation of Players' Position From Image Sequences of Soccer Game TV Program", vol. 103, No. 585, pp. 95-100.

* cited by examiner

*Primary Examiner* — Sath V Perungavoor
*Assistant Examiner* — Xiaolan Xu
(74) *Attorney, Agent, or Firm* — Lerner, David, Littenberg, Krumholz & Mentlik, LLP

(57) ABSTRACT

A display control apparatus includes a receiving unit that receives a television broadcast signal containing at least remote broadcast image information, a display unit that displays image information contained in the television broadcast signal, a player information acquiring unit that acquires, from the remote broadcast image information, information regarding players in a sports game included in a broadcast image signal, a field information acquiring unit that acquires field information from the remote broadcast image information, a player position information acquiring unit that acquires player position information from the image signal using the player information and the field information, a player information providing unit that provides the acquired player information by displaying the player information on the display unit, and a cursor control function unit that sets, using the player position information, a cursor on one of the players selected using the provided player information and displayed on the display unit.

12 Claims, 18 Drawing Sheets

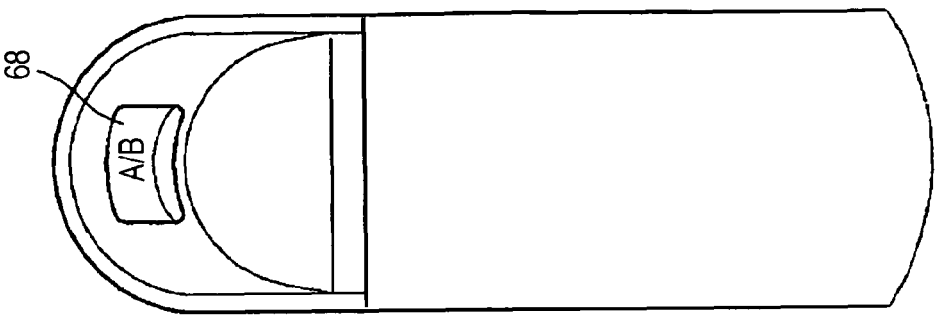
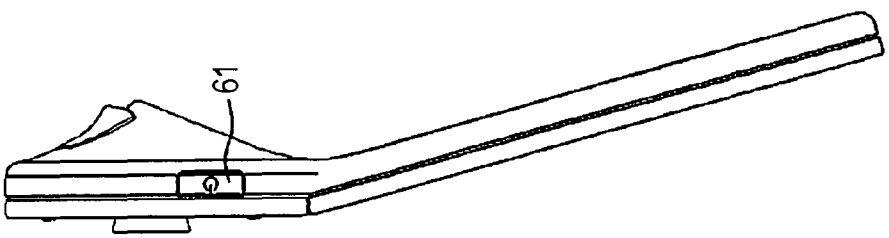
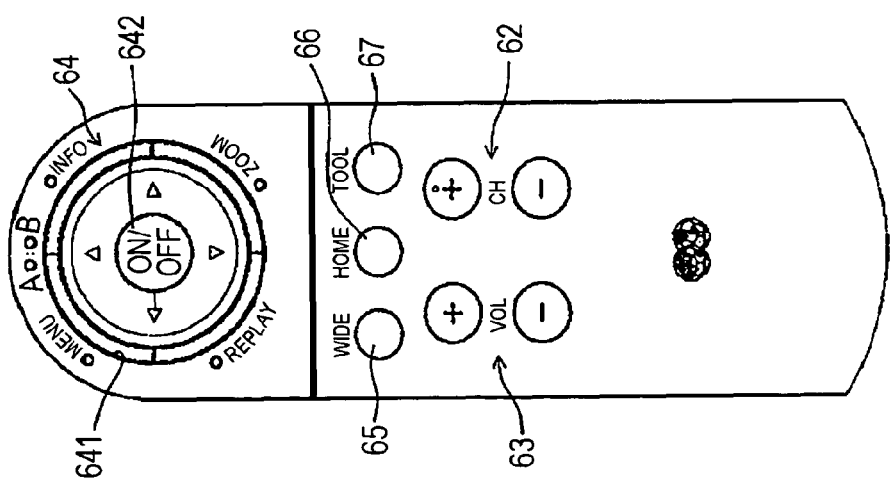

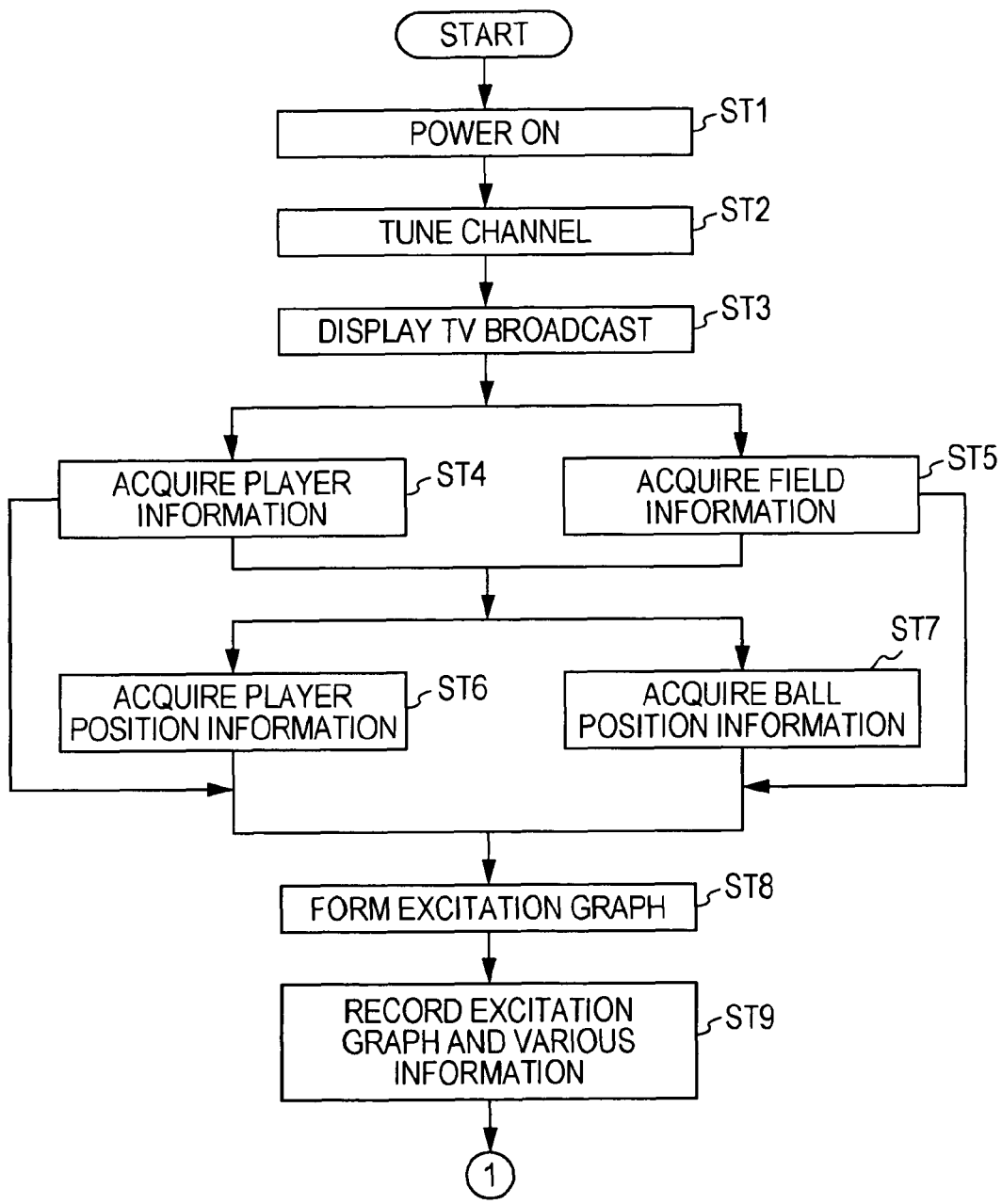

DISPLAY CONTROL APPARATUS, DISPLAY CONTROL METHOD, AND PROGRAM

CROSS-REFERENCE TO RELATED APPLICATION

The present application claims priority from Japanese Patent Application No. JP 2008-243072 filed in the Japanese Patent Office on Sep. 22, 2008, the entire content of which is incorporated herein by reference.

BACKGROUND OF THE INVENTION

1. Field of the Invention

The present invention relates to a display control apparatus, a display control method, and a program capable of processing a moving image of a sports game, such as a soccer game in which players chase a moving object to be propelled in the sports game (e.g., a ball) to score.

2. Description of the Related Art

A soccer game has become more and more popular in recent years. Accordingly, soccer games have been broadcasted on television.

Not only Japanese domestic soccer games but also foreign soccer games (e.g., league games in European countries and countries in South America, world cup games, preliminary rounds of European championship, and the championship game) have been broadcasted on television.

In addition, with technical advance of television display devices, such as liquid crystal monitors, and with an increase in the size of television display devices, video of soccer games including fast motions has been naturally displayed. For example, skillful dribbling and shooting scenes can be clearly and beautifully broadcasted and displayed on television display devices.

SUMMARY OF THE INVENTION

In general, out-of-door games, such as soccer games, are played on a large field. Accordingly, since it is necessary that a television camera capture the image of a wide area of the field or an area in the vicinity of a ball (the moving object to be propelled in the game), the television camera is placed at a relatively high position relative to the stadium.

Accordingly, while the game is being played, an image of a wide area of the field or a small area near the ball is displayed, and a panning, tilting, or zoom operation is performed when the image is captured, if necessary.

For example, a zoom-in operation is performed on a player who has just scored a goal or an area in which a player committed a foul. Such a zoom-in operation is widely performed, and the zoom-in operation satisfies viewers of a soccer TV broadcast.

However, in general, soccer TV broadcasts tend to show a large area of the field, and it is difficult for viewers to identify individual players.

In addition, viewers (users) who want to watch a specific player desire to zoom in the player by themselves and enjoy the game.

In order to identify individual players playing in the large field, the names of the players may be displayed in the vicinity of the heads of the players in a screen. However, with this method, the viewers may not enjoy the game.

In addition, a soccer game has a rule called offside. However, in many cases, it is difficult for the viewer to recognize the offside line. Furthermore, in some cases, it is difficult for the viewer to trace the motion and trajectory of a ball.

Still furthermore, during a 90-minute game period, onlookers are often wildly excited (e.g., at a goal scene). In such a case, it is difficult for the viewers to immediately watch the scene in a recorded video.

Accordingly, the present invention provides a display control apparatus, a display control method, and a program that allows a viewer to display desired information associated with a game on a screen during a game broadcast.

According to an embodiment of the present embodiment, a display control apparatus includes a receiving unit configured to receive a television broadcast signal containing at least remote broadcast image information, a display unit configured to display image information contained in the television broadcast signal, a player information acquiring unit configured to acquire, from the remote broadcast image information, information regarding players in a sports game included in a broadcast image signal, a field information acquiring unit configured to acquire field information from the remote broadcast image information, a player position information acquiring unit configured to acquire player position information from the image signal on the basis of the player information and the field information, a player information providing unit configured to provide the player information acquired by the player information acquiring unit by displaying the player information on the display unit, and a cursor control function unit configured to set, using the player position information, a cursor on one of the players selected using the player information provided by the player information providing unit and displayed on the display unit.

The display control apparatus can further include a moving object position information acquiring unit configured to acquire position information regarding a position of a moving object to be propelled in the sports game from the image signal on the basis of the field information. The cursor control function unit can set the cursor on the moving object to be propelled in the sports game when instructed to set the cursor on the moving object.

The display control apparatus can further include a player information control function unit configured to, upon receiving a player information display instruction, display the player information in the vicinity of the player on the basis of the position information regarding a position of a moving object to be propelled in the sports game, the player position information, and the player information.

The player information control function unit can display the player information regarding the player located within a predetermined area, at the center of which is the moving object to be propelled in the sports game, in the vicinity of the player.

If a team is selected, the player information control function unit can display the player information regarding the players of the selected team.

The display control apparatus can further include an automatic tracking control function unit configured to, when the cursor is set on an object to be set by the cursor control function unit, cause the cursor to automatically track the object in accordance with movement of the object.

Upon receiving a zoom-in instruction, the cursor control function unit can zoom in and display at least an area indicated by the cursor.

The player information providing unit can arrange and display a plurality of the player information items in part of an entire display area of the display unit.

The player information providing unit can display the player information separately for each of the teams.

The player information providing unit can display the player information regarding the player having the cursor set thereon in a format different from that for the other players.

According to another embodiment of the present invention, a display control method includes the steps of receiving a television broadcast signal containing at least remote broadcast image information, displaying image information contained in the television broadcast signal on a display unit, acquiring, from the remote broadcast image information, information regarding players in a sports game included in a broadcast image signal, acquiring field information from the remote broadcast image information, acquiring player position information from the image signal on the basis of the player information and the field information, providing the player information acquired by the player information acquiring unit by displaying the player information on the display unit, and setting, using the player position information, a cursor on one of the players selected using the provided player information and displayed on the display unit.

According to still another embodiment of the present invention, a program includes program code for causing a computer to execute a display control process. The display control process includes the steps of receiving a television broadcast signal containing at least remote broadcast image information, displaying image information contained in the television broadcast signal on a display unit, acquiring, from the remote broadcast image information, information regarding players in a sports game included in a broadcast image signal, acquiring field information from the remote broadcast image information, acquiring player position information from the image signal on the basis of the player information and the field information, providing the player information acquired by the player information acquiring unit by displaying the player information on the display unit, and setting, using the player position information, a cursor on one of the players selected using the provided player information and displayed on the display unit.

According to the present invention, for example, the receiving unit receives a television broadcast signal containing remote broadcast image information of a sports game, and the received remote broadcast image is displayed on the display unit. In addition, from the received information, the player information acquiring unit acquires player information. The field information acquiring unit acquires field information. The player position information acquiring unit acquires player position information. The acquired information is supplied to the cursor control function unit. Furthermore, the player information acquired by the player information acquiring unit is displayed on the display unit by the player information providing unit. The cursor control function unit sets, using the player position information, a cursor on one of the players selected using the player information provided by the player information providing unit on the display unit.

According to the present invention, a service that allows a viewer to immediately acquire desired additional information while watching a TV broadcast image can be provided.

BRIEF DESCRIPTION OF THE DRAWINGS

FIGS. 14A to 14D illustrate an exemplary configuration of a remote commander according to the present embodiment;

FIG. 15 is a first flowchart illustrating the operation performed by the display control apparatus according to the embodiment;

DESCRIPTION OF THE PREFERRED EMBODIMENTS

Various exemplary embodiments of the present invention are described below with reference to the accompanying drawings.

Figure 1:
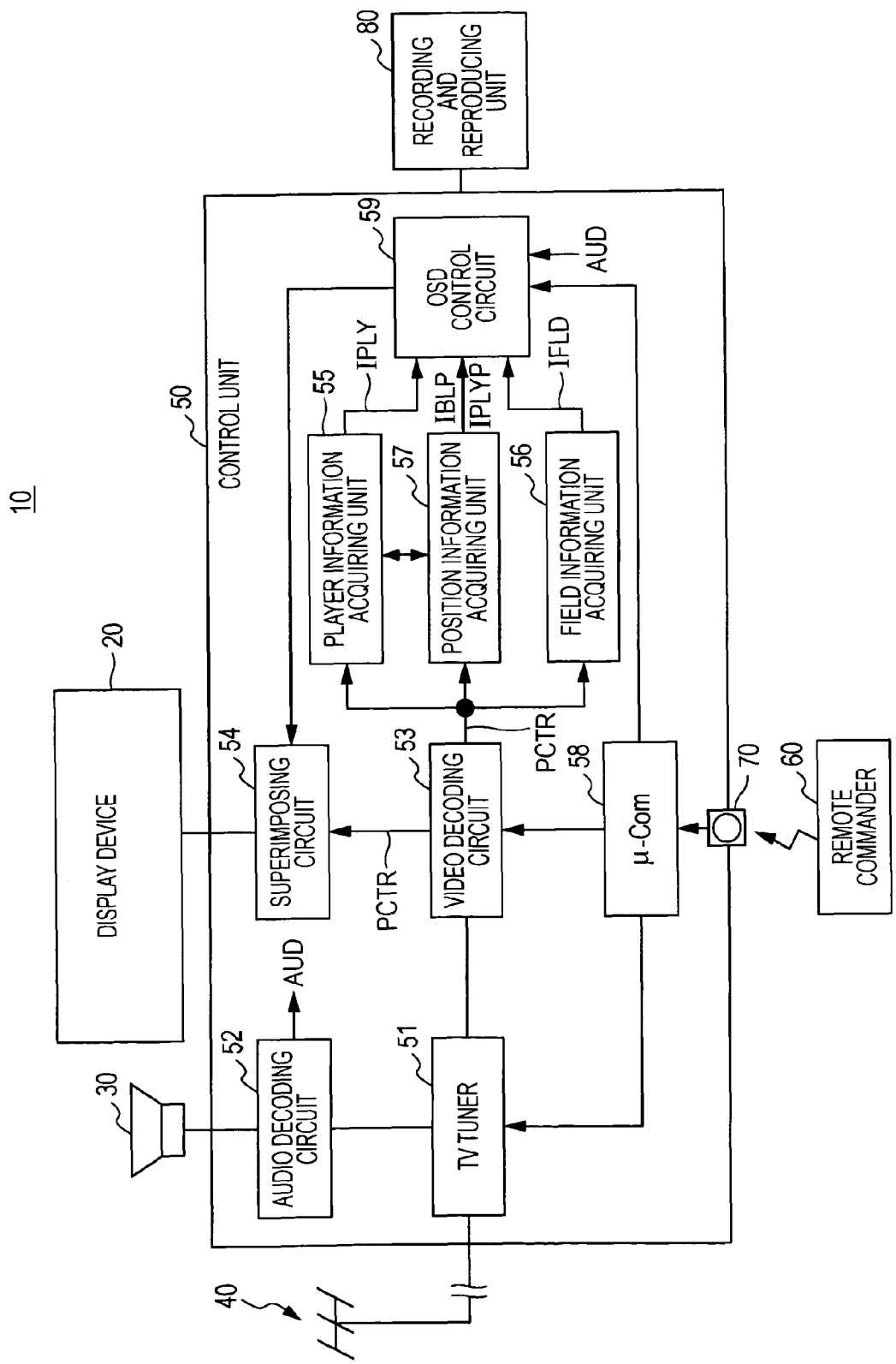
FIG. 1 is a block diagram illustrating an exemplary configuration of a display control apparatus according to an embodiment of the present invention.
Figure 2:
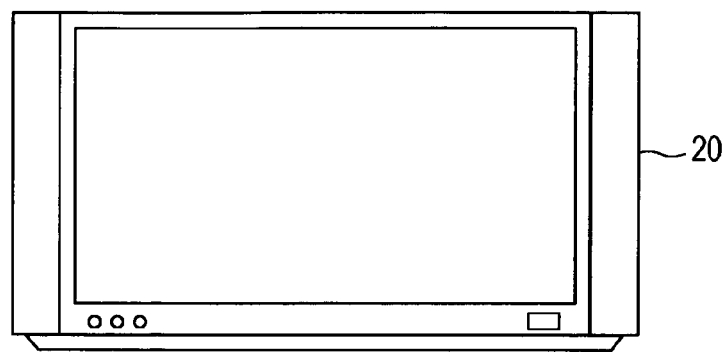
FIG. 2 is a schematic illustration of a display device of the display control apparatus according to the embodiment of the present invention.

FIG. 1 is a block diagram illustrating an exemplary configuration of a display control apparatus according to an embodiment of the present invention. FIG. 2 is a schematic illustration of a display device of the display control apparatus according to an embodiment of the present invention.

According to the present embodiment, a display control apparatus 10 includes a display device 20, a speaker 30, a television (TV) antenna 40, a control unit 50, a remote commander 60 serving as an operation unit, a light receiving unit 70, and a recording and reproducing unit 80.

The display device 20 serving as a display unit is formed from a flat display, such as a liquid crystal display device or an organic electroluminescence (EL) device. As shown in FIG.

2, the display device 20 has a horizontally long aspect ratio. For example, the aspect ratio of the display device 20 is 16:9.

Sound output from the speaker 30 is controlled by the control unit 50 that receives a television (TV) broadcast signal.

The control unit 50 receives a TV broadcast signal via the TV antenna 40 and decodes an audio signal and a video signal. Thereafter, the control unit 50 controls the speaker 30 to output sound based on the audio signal. In addition, the control unit 50 controls the display device 20 to display a broadcast video based on the TV broadcast signal tuned by a viewer (a user).

According to the present embodiment, the control unit 50 has the following various functions.

The control unit 50 has a function of acquiring, from broadcast video information, player information regarding a player of a game included in a broadcast video signal, for example, a soccer game. The control unit 50 further has a function of acquiring field information using a correspondence between a line in the broadcast video and a field model.

Still furthermore, the control unit 50 has a function of acquiring player position information regarding a player position from the video signal on the basis of the player information and the field information. Yet still furthermore, the control unit 50 has a function of acquiring information regarding the position of a ball serving as a moving object to be propelled in the game from the video signal on the basis of the field information and a function of displaying the player information on the display device 20.

When displaying the player information, the control unit 50 has a function of arranging a plurality of player information items and displaying the player information items in part of a display area.

In addition, the control unit 50 can display the player information for each team. The control unit 50 can display a player information item indicated by a cursor in a different way from the other player information items (e.g., highlight display).

Hereinafter, the descriptions are made with reference to a ball serving as a moving object to be propelled in the sports game.

Furthermore, the control unit 50 has a function of setting a cursor on a player selected by provided player information and displayed on the display device 20 using the player position information. Still furthermore, the control unit 50 has a function of setting a cursor on a ball that is selected to be indicated by the cursor.

Furthermore, the control unit 50 has a function of, upon receiving an instruction to display player information, displaying the player information in the vicinity of the player on the basis of the ball position information, the player position information, and the player information. At that time, the control unit 50 can display the player information in the vicinity of each of the players located in a predetermined area, at the center of which is the ball.

Still furthermore, the control unit 50 has a function of, after a cursor is set on an object, such as a player or a ball, automatically tracking the object when the object moves. Upon receiving a zoom instruction, the control unit 50 including an auto tracking control function sub-unit enlarges and displays at least the area indicated by the cursor.

Still furthermore, the control unit 50 has a function of forming a line regarding the ball, such as an offside line of soccer or a trajectory of the ball, using the ball position information, the player position information, the player information, and the field information. The control unit 50 forms an offside line having a predetermined width, not a simple line.

Still furthermore, the control unit 50 has a function of receiving the audio signal in the television broadcast signal and creating an excitation graph indicating an excitation level of the broadcast game with respect to a time line of the broadcast video. The control unit 50 associates the created excitation graph with time information and the player information and records the excitation graph in the recording and reproducing unit 80 together with the video of the game.

Upon receiving information indicating game interruption, such as a halftime break, the control unit 50 instructs the display device 20 to display a live image, the player information, and the excitation graph together with the video of the game recorded in the recording and reproducing unit 80.

The control unit 50 can selectively display the excitation graph for each of predetermined periods of time in the time line. Alternatively, the control unit 50 selectively displays the player information items. Upon receiving an instruction to select the periods in which a selected and displayed player appears in the broadcast image, the control unit 50 plays back and displays the recorded video for the selected periods.

As shown in FIG. 1, the control unit 50 having such functions includes a TV tuner 51 and an audio decoding circuit 52. The control unit 50 further includes a video decoding circuit 53, a superimposing circuit 54, a player information acquiring unit 55, a field information acquiring unit 56, a position information acquiring unit 57, a microcomputer (μ-Com) 58, and an on-screen display (OSD) control circuit 59.

Under the control of the microcomputer 58, the TV tuner 51 receives and demodulates a TV broadcast signal of a selected TV broadcast channel. Thereafter, the microcomputer 58 supplies the audio signal to the audio decoding circuit 52 and supplies the video signal to the video decoding circuit 53.

Note that, under the control of the microcomputer 58, the received broadcast signal is recorded in the recording and reproducing unit 80, and the recorded information is reproduced and displayed on the display device 20.

The audio decoding circuit 52 decodes the audio signal and outputs the decoded audio signal to the speaker 30. In addition, the audio decoding circuit 52 supplies an audio signal AUD to an OSD control circuit 59.

Under the control of the microcomputer 58, the video decoding circuit 53 decodes the video signal to generate a decoded video signal PCTR. Thereafter, the video decoding circuit 53 supplies the decoded signal PCTR to the superimposing circuit 54, the player information acquiring unit 55, the field information acquiring unit 56, and the position information acquiring unit 57.

By using the OSD control circuit 59, the superimposing circuit 54 superimposes, on the display device 20, various information (e.g., a cursor, the name of a player, the uniform number of the player, an offside line, or a ball trajectory image serving as additional information) over the signal PCTR output from the video decoding circuit 53. Thereafter, the superimposing circuit 54 displays the image.

The superimposing circuit 54 has a function of superimposing, using the OSD control circuit 59, the excitation graph over a playback video reproduced by the recording and reproducing unit 80 and displaying the image on the display device 20.

The player information acquiring unit 55 acquires the ball game information included in the broadcast video signal, such as player information IPLY regarding players (start players and reserve players) of the two soccer teams. Thereafter, the player information acquiring unit 55 stores the player information IPLY.

The player information IPLY acquired by the player information acquiring unit 55 includes the names of the players, the uniform numbers of the players, and photos of the faces of the players.

The player information acquiring unit 55 supplies the acquired and stored player information IPLY to the field information acquiring unit 56 and the OSD control circuit 59.

The field information acquiring unit 56 acquires field information IFLD from an unedited TV broadcast video of a soccer game using a correspondence between a line in an input image and a field model. Thereafter, the field information acquiring unit 56 stores the field information IFLD and, subsequently, supplies the acquired and stored field information IFLD to the field information acquiring unit 56 and the OSD control circuit 59.

The position information acquiring unit 57 acquires, from the video signal PCTR of the soccer TV broadcast, ball position information IBLP regarding a ball located inside or outside the field using the field information IFLD and position information IPLYP regarding each of the players on the basis of the field information IFLD and the player information IPLY. Thereafter, the position information acquiring unit 57 supplies the acquired ball position information IBLP and the player position information IPLYP to the OSD control circuit 59.

Figure 3:
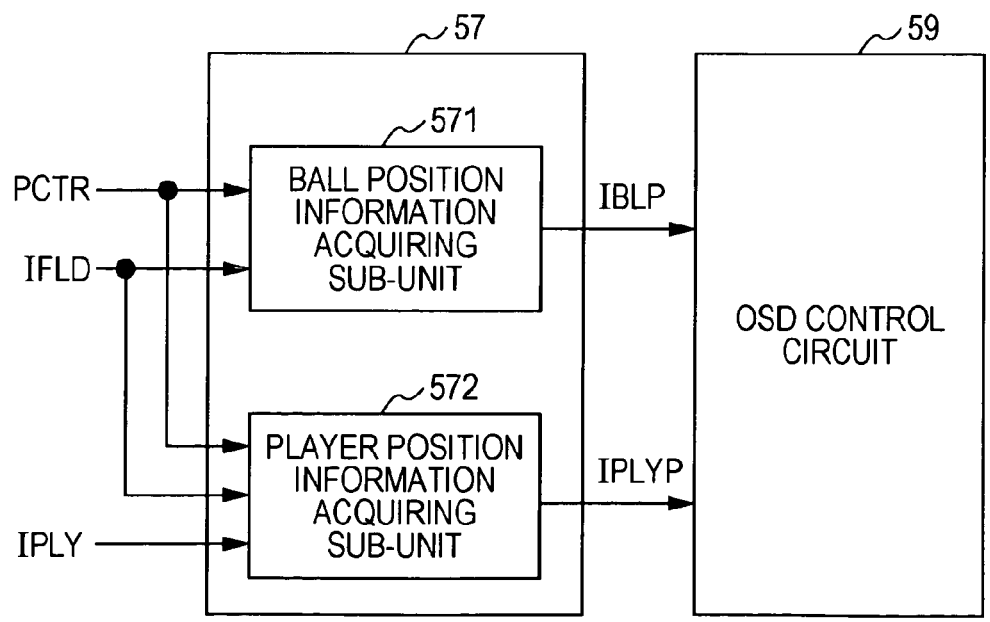
FIG. 3 is a block diagram illustrating an exemplary configuration of a position information acquiring unit according to the embodiment.

FIG. 3 is a block diagram illustrating an exemplary configuration of the position information acquiring unit 57 according to the present embodiment.

As shown in FIG. 3, the position information acquiring unit 57 includes a ball position information acquiring sub-unit 571 serving as a moving-object position information acquiring unit and a player position information acquiring sub-unit 572.

The ball position information acquiring sub-unit 571 acquires, from the video signal PCTR of the soccer TV broadcast, the position information IBLP regarding the ball located inside or outside the field using the field information IFLD. Thereafter, the ball position information acquiring sub-unit 571 supplies the acquired position information IBLP to the OSD control circuit 59.

The player position information acquiring sub-unit 572 acquires, from the video signal PCTR of the soccer TV broadcast, the player information IPLYP regarding each of the players located inside or outside the field using the field information IFLD and the player information IPLY. Thereafter, the player position information acquiring sub-unit 572 supplies the acquired position information IPLYP to the OSD control circuit 59.

For example, in order to acquire the position information in the ball position information acquiring sub-unit 571 and the player position information acquiring sub-unit 572, a technology such as but not limited to the technology described in the following Non-Patent document can be applied:

The Institute of Electronics, Information and Communication Engineers Report, PRMU, Image Recognition and Media Understanding, Technical report of IEICE. PRMU, Vol. 103, No. 585 (20040116), pp. 95-100, PRMU2003-214, The Institute of Electronics, Information and Communication Engineers, ISSN: 09135685

In such a case, the position information acquiring unit 57 computes, from unedited TV broadcast image of a soccer game, a homography matrix using a correspondence between a line in the input video signal and a field model. The position information acquiring unit 57 then estimates the ball position and the player positions in the field.

Unlike video captured by a fixed camera, TV broadcast video includes moving images obtained through panning, tilting, and zoom operations. Accordingly, the homography matrix changes as time passes.

Therefore, in order to compute the homography matrix, the position information acquiring unit 57 compares the correspondences between lines in the video and the field model with each other in a space generated by parameters of Hough transform. Thus, the position information acquiring unit 57 computes a correspondence between the lines and estimates the homography matrix and, subsequently, estimates the ball position and the players' positions in the field.

For example, the ball position information and the player position information acquired by the position information acquiring unit 57 during the game play are recorded in the recording and reproducing unit 80 together with the time information and the excitation graph while the video is being recorded.

In response to an instruction signal received from the remote commander 60, the microcomputer 58 controls the control unit 50 functioning as a TV receiver. In response to an instruction signal received from the remote commander 60, the microcomputer 58 changes a channel or controls the volume.

In addition, the microcomputer 58 analyzes a signal input from the remote commander 60. In accordance with the analysis processing, the microcomputer 58 sends, to the OSD control circuit 59, an instruction to generate various information, such as a cursor, the name of a player, the uniform number of the player, the offside line, or the trajectory of the ball serving as additional information, and an instruction regarding OSD display.

In response to a command CMD of the microcomputer 58, the OSD control circuit 59 generates a variety of OSD video signals for displaying icons, characters, and figures in the display screen. The OSD control circuit 59 then outputs the OSD video signals to the superimposing circuit 54.

In addition, in response to a command CMD of the microcomputer 58, the OSD control circuit 59 generates various information, such as a cursor, the name of a player, the uniform number of the player, the offside line, the trajectory of the ball, an excitation graph, and a photo of the face of the player serving as additional information.

Subsequently, the OSD control circuit 59 outputs the generated OSD video signals to the superimposing circuit 54.

The video based on the OSD video signals is superimposed over the video based on the TV video signal output from the video decoding circuit 53 by the superimposing circuit 54. The video is then output to the display device 20.

In addition, the OSD control circuit 59 has a sub-display function of displaying, in response to the command CMD received from the microcomputer 58, the photos of the faces and the names of the players for each of the teams in a predetermined sub-area of the display area when, for example, TV broadcast video of a soccer game is displayed on the display device 20.

Figure 4:
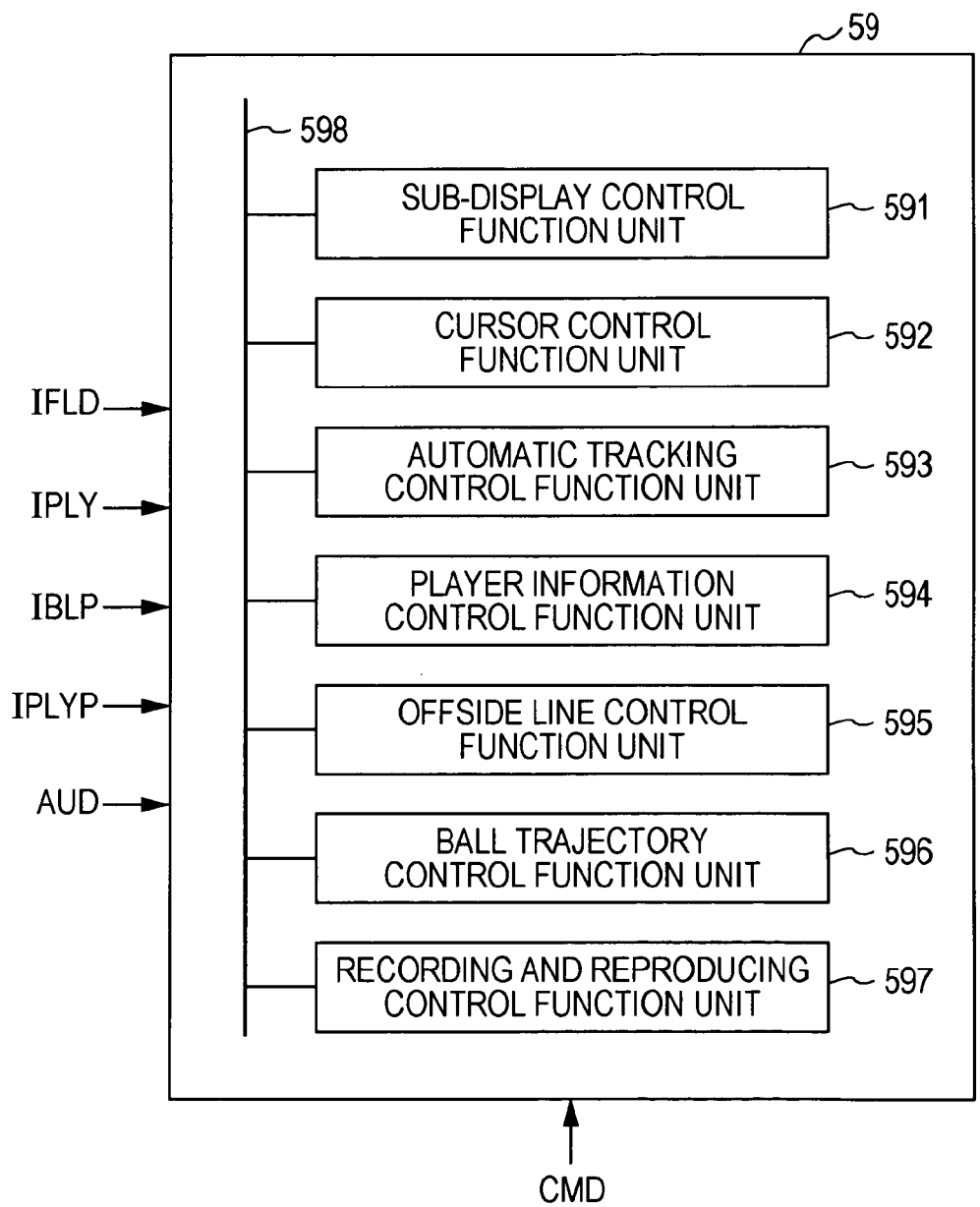
FIG. 4 is a functional block diagram of a main portion of an OSD control circuit according to the embodiment.

FIG. 4 is a functional block diagram of a main portion of the OSD control circuit 59 according to the present embodiment.

As shown in FIG. 4, the OSD control circuit 59 includes a sub-display control function unit 591, a cursor control function unit 592, an automatic tracking control function unit 593, a player information control function unit 594, an offside line control function unit 595, a ball trajectory control function unit 596, and a recording and reproducing control function unit 597.

The sub-display control function unit 591, the cursor control function unit 592, the automatic tracking control function unit 593, the player information control function unit 594, the offside line control function unit 595, the ball trajectory control function unit 596, and the recording and reproducing control function unit 597 are connected to a bus 598.

Note that the sub-display control function unit 591 functions as a player information providing unit. In addition, the offside line control function unit 595 and the ball trajectory control function unit 596 function as a line forming unit.

In addition, the sub-display control function unit 591 has a function of displaying, in response to the command CMD received from the microcomputer 58, the photos of the faces and the names of the players for each of the teams in a predetermined sub-area of the display area when, for example, TV broadcast video of a soccer game is displayed on the display device 20.

Note that the sub-display function is started in response to a sub-display command CMD submitted by the microcomputer 58 when a user selects a favorite mode using, for example, the remote commander 60.

Figure 5:
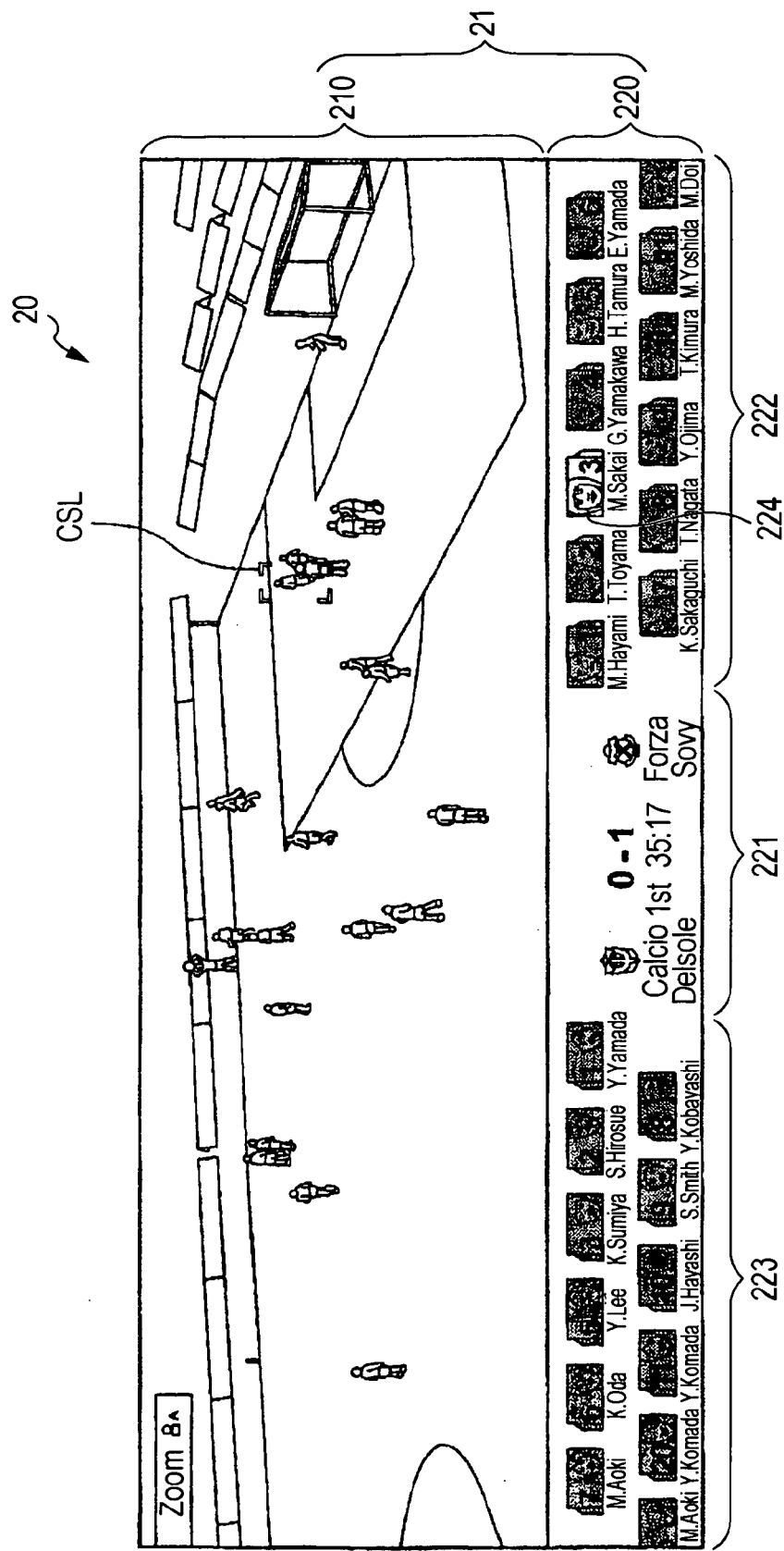
FIG. 5 illustrates an example of a display screen of the display device including a sub-display area.

FIG. 5 illustrates an example of a display screen of the display device including a sub-display area.

In the example of FIG. 5, a sub-display area 220 is formed and displayed in the lower section of a main display area 210 in a display area 21 of the display device 20.

A score display area 221 used for displaying the score of the game is provided in the middle of the sub-display area 220. Display areas 222 and 223 used for displaying the player information of the opposing teams are formed on either side of the score display area 221.

The sub-display control function unit 591 controls the display areas 222 and 223 so that the photos of the faces and the names (Romaji representation for Japanese players) of the players of the two teams are displayed in the display areas 222 and 223.

In addition, the sub-display control function unit 591 forms a face photo display area 224 for each of the players so that the face photo display area 224 is selectable. For example, the selected face photo display area 224 is highlighted.

Furthermore, when the sub-display control function unit 591 displays the name and uniform number of at least one of the players in the main display area 210, the sub-display control function unit 591 highlights the face photo display area 224 of the player.

As used herein, the term "highlight" refers to displaying an area with a luminance higher than that of the other areas.

For example, when a particular player is selected in the sub-display area and if the cursor control function unit 592 receives a cursor setting command CMD from the microcomputer 58, the cursor control function unit 592 displays a cursor so that the cursor surrounds a player in the field displayed in the main display area 210 using the player position information.

Figure 6:
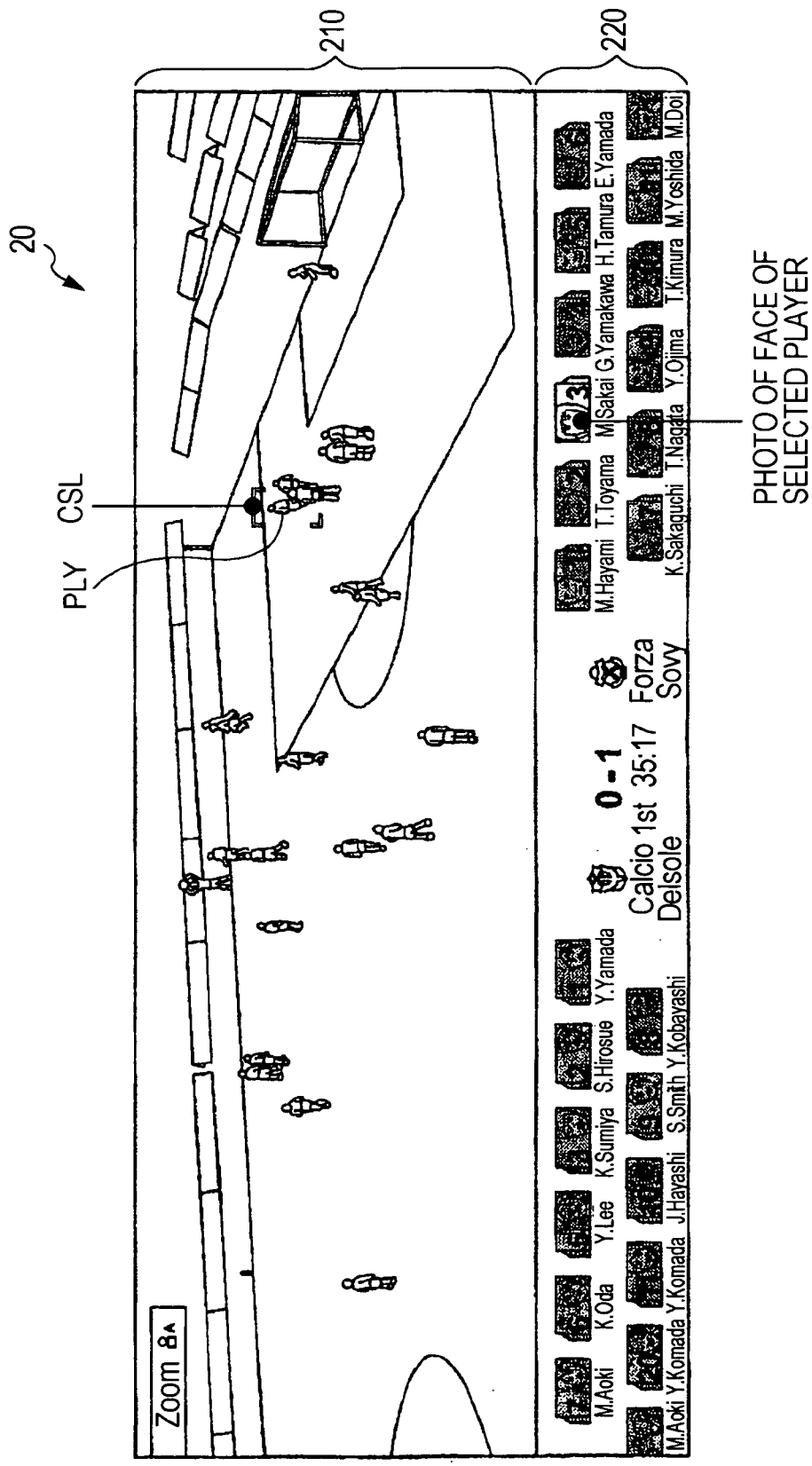
FIG. 6 illustrates a screen in which a cursor is set on a selected player.

FIG. 6 illustrates a screen in which a cursor CSL is set on a selected player.

As shown in FIG. 6, when, for example, a particular player is selected in the sub-display area, the cursor control function unit 592 sets the cursor CSL on the player in the field displayed in the main display area 210 so that the cursor surrounds the player on the basis of the player position information.

After placing the cursor CSL on the selected player, if the cursor control function unit 592 receives a movement command CMD from the microcomputer 58, the cursor control function unit 592 moves the cursor CSL in a direction indicated by the movement command CMD. The direction corresponds to one of all directions determined by a user operation of a movement instruction switch of the remote commander 60.

After placing the cursor CSL on the selected player, if the cursor control function unit 592 receives a zoom-in command CMD from the microcomputer 58, the cursor control function unit 592 zooms in on the player indicated by the cursor CSL and the vicinity of the player by a zoom factor indicated by the zoom-in command. The zoom factor is determined by a user operation of a zoom switch of the remote commander 60.

Figure 7:
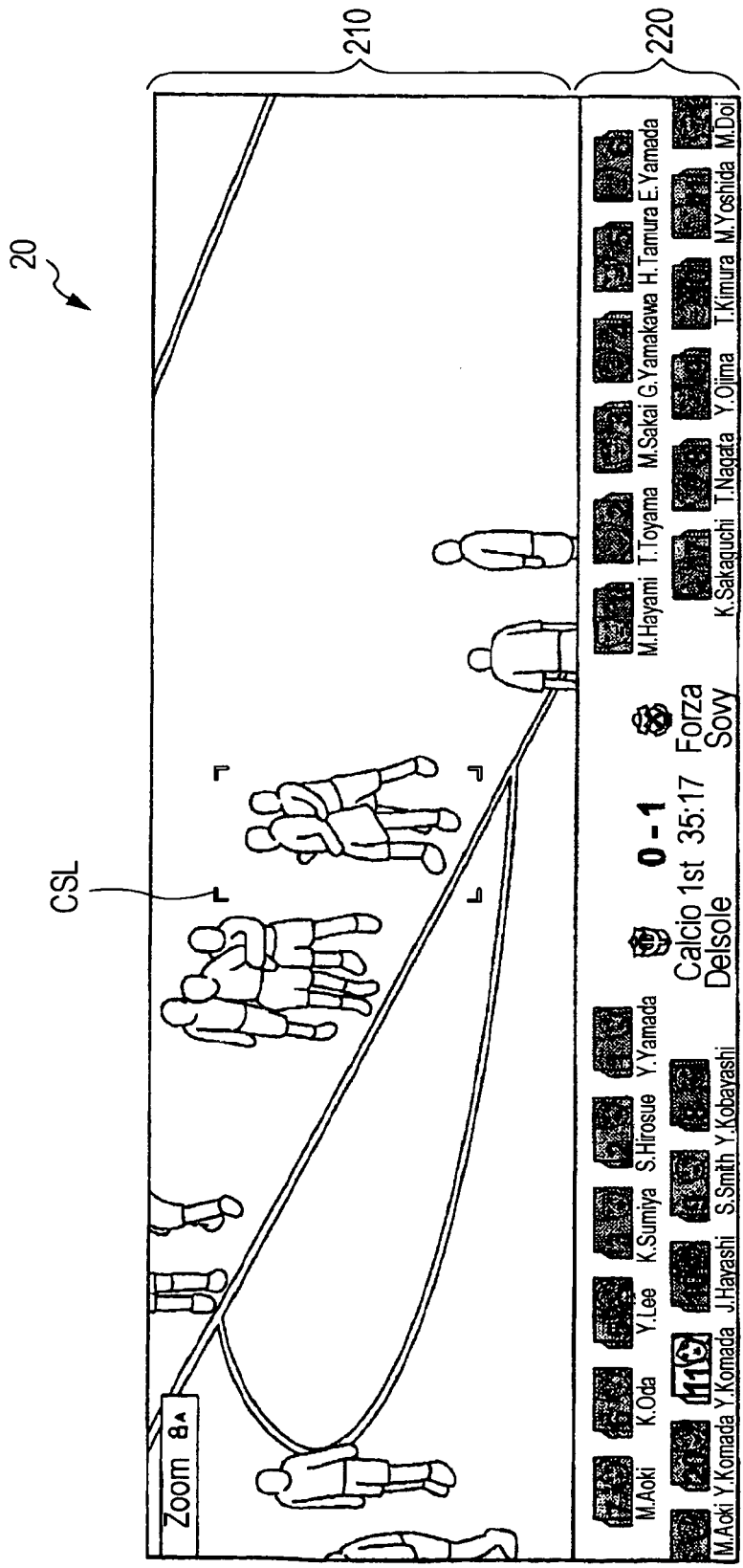
FIG. 7 illustrates a first example of a zoom-in operation performed on a player selected using a cursor.
Figure 8:
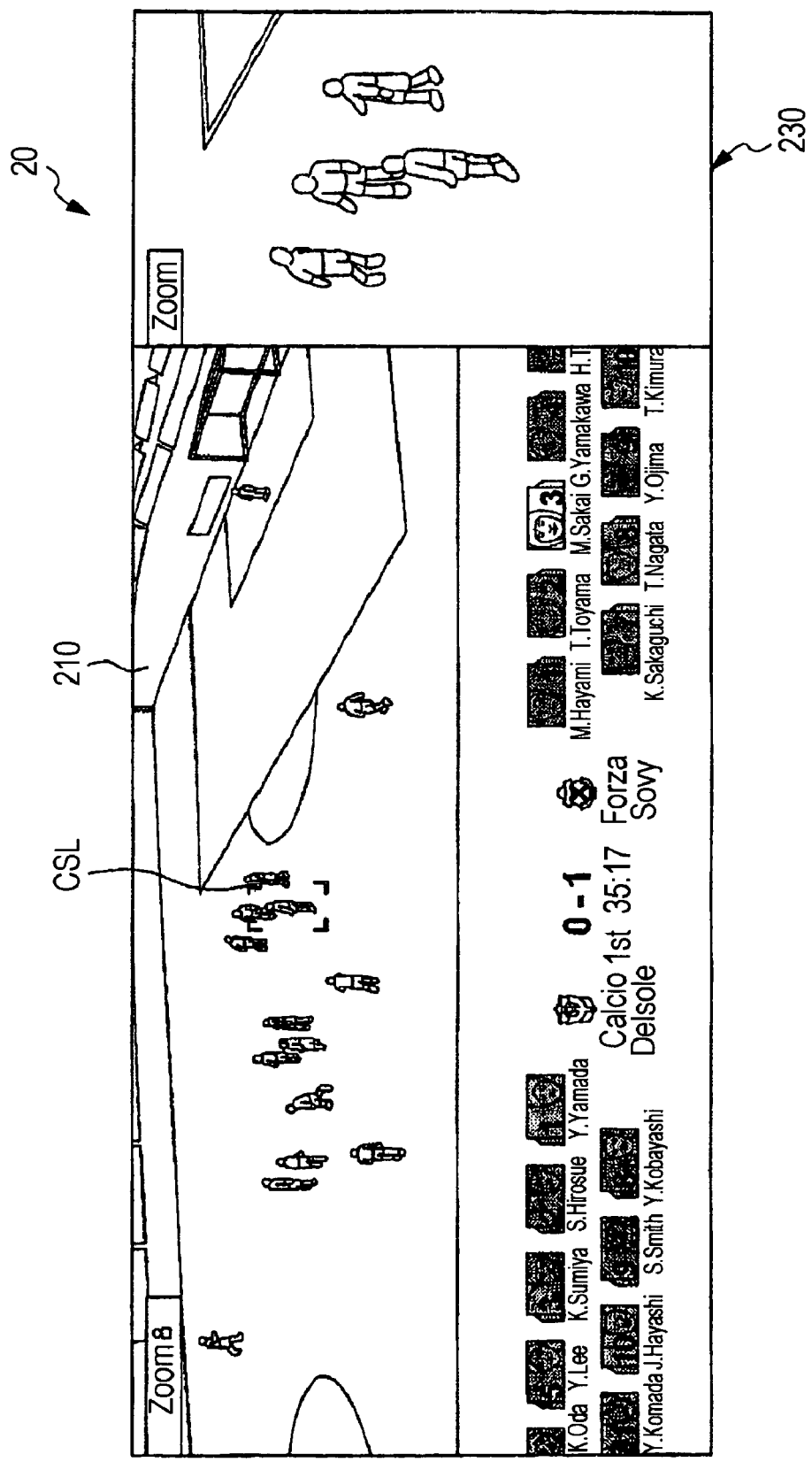
FIG. 8 illustrates a second example of a zoom-in operation performed on a player selected using a cursor.

FIG. 7 illustrates a first example of a zoom-in operation performed on a player selected using the cursor CSL. FIG. 8 illustrates a second example of a zoom-in operation performed on a player selected using the cursor CSL.

As shown in FIGS. 7 and 8, after placing the cursor CSL on the selected player, if the cursor control function unit 592 receives the zoom-in command CMD, the cursor control function unit 592 zoom in the player selected using the cursor CSL in the screen.

In the first example shown in FIG. 7, a displayed image in the main display area 210 is enlarged. In contrast, in the second example shown in FIG. 8, the size of a displayed image in the main display area 210 remains the same. However, a sub-display area 230 is formed on the right side of the drawing, and a zoom-in image of an area selected by the cursor CSL is displayed in the sub-display area 230.

The cursor control function unit 592 has a function of changing the zoom-in display image to the normal display image when the cursor control function unit 592 receives a zoom-in cancel command.

The cursor control function unit 592 further has a function of, upon receiving a cursor setting command for a ball from the microcomputer 58, setting the cursor CSL on the ball so that the cursor surrounds the ball.

Figure 9:
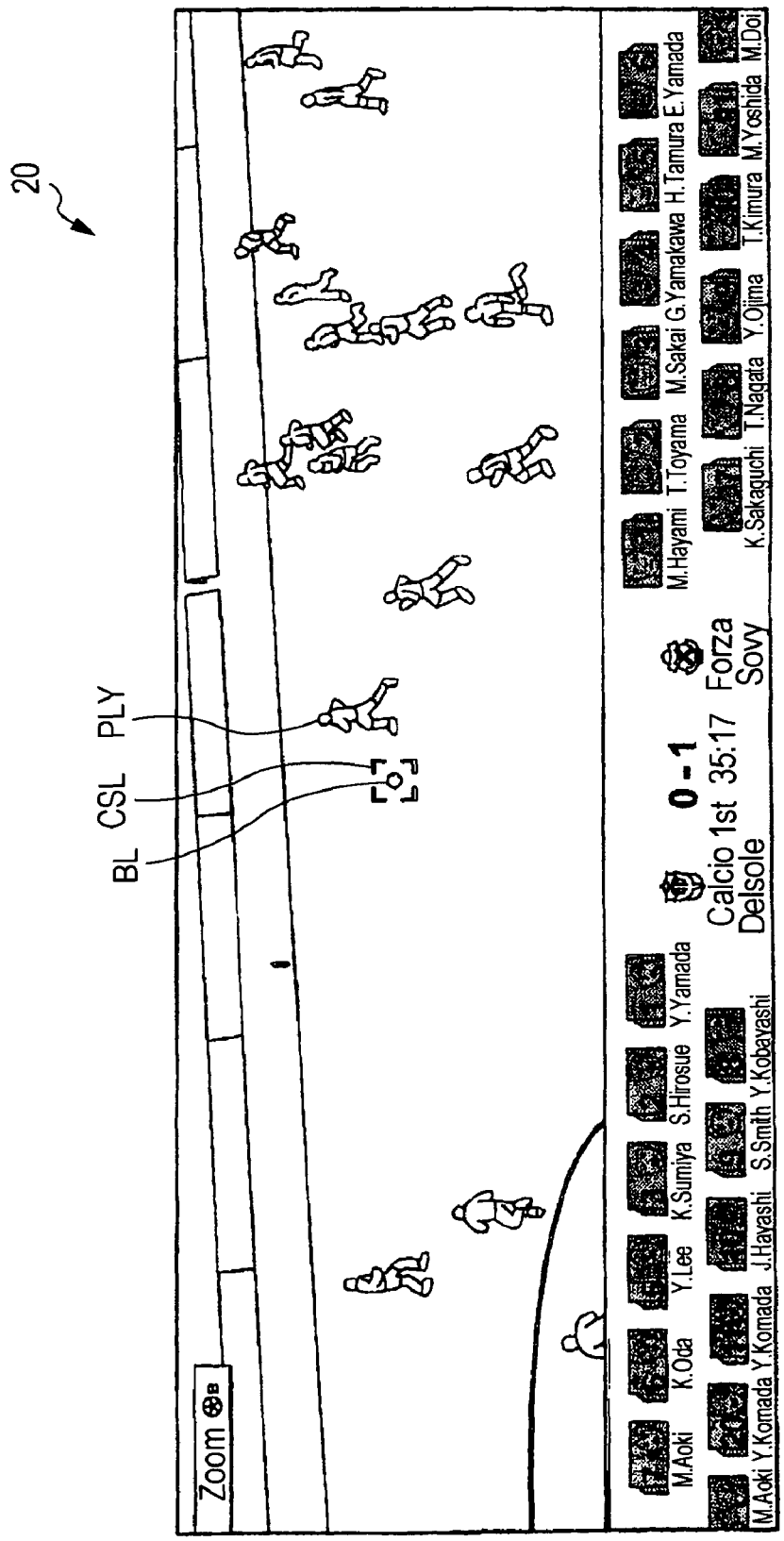
FIG. 9 illustrates a screen in which a cursor is set on a ball.

FIG. 9 illustrates a screen in which the cursor CSL is set on a ball.

As shown in FIG. 9, upon receiving a cursor setting command CMD for a ball BL from the microcomputer 58, the cursor control function unit 592 sets the cursor CSL on the ball BL so that the cursor surrounds the ball BL.

Once the cursor CSL is set on a player PLY or the ball BL, the cursor control function unit 592 automatically tracks, using a tracking function of the automatic tracking control function unit 593, the player PLY or the ball while placing the cursor CSL on the player PLY or the ball BL.

For example, as shown in FIG. 9, once the cursor control function unit 592 places the cursor CSL on the player PLY or the ball BL, the automatic tracking control function unit 593 causes the cursor CSL to track the selected player PLY or ball BL. According to this tracking function, it is not necessary that the user's eyes seriously chase the player PLY or the ball BL and, therefore, the user can view a desired game scene in a relaxed state.

Upon receiving a player information display command CMD, the player information control function unit 594 displays, in the vicinity of the heads of players located within a predetermined area, at the center of which is the ball BL, the names and uniform numbers of the players on the basis of the position information IBLP, the player position information IPLYP, and the player information IPLY.

If the player information control function unit 594 has received a command CMD containing a selected team name (Team A or Team B), the player information control function unit 594 displays the names and uniform numbers of the players in the vicinity of the heads of the players of the selected Team A or Team B located within the predetermined area, at the center of which is the ball BL.

The reason why the player information control function unit 594 displays the names and uniform numbers of only the players located within a predetermined area, at the center of which is the ball BL, is as follows.

During game play, the user may want to know which player is at which location. If the names and uniform numbers are displayed in the vicinity of the heads of all of the players, the screen becomes messy and, therefore, it is difficult for the user to easily view the screen. Accordingly, the names and uniform numbers of only players who possibly receive the ball are displayed.

Figure 10:
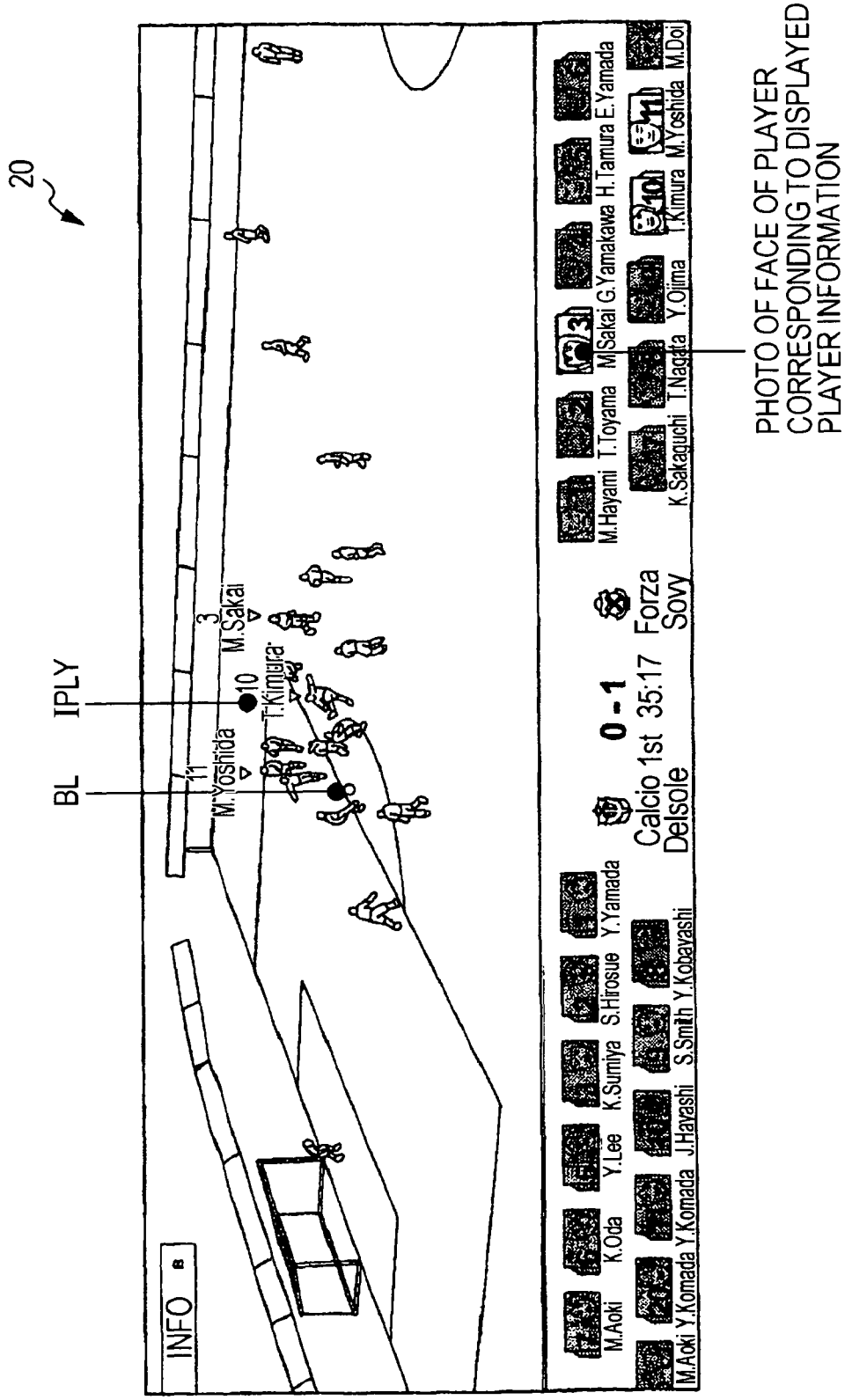
FIG. 10 is a diagram illustrating an example in which player information (the names and the uniform numbers) of only players located in the vicinity of a ball are displayed.

FIG. 10 is a diagram illustrating an example in which the names and uniform numbers of only players located in the vicinity of the ball are displayed.

If the player information control function unit 594 has received a command CMD containing a selected team name (Team A or Team B), the user manually selects one of Team A and Team B. Thereafter, as shown in FIG. 10, the player information control function unit 594 displays the uniform numbers and names of the players in the vicinity of the heads of the players of the selected team located in the vicinity of the ball.

In the example shown in FIG. 10, the uniform numbers and names of players 10, 11, and 3 of Team A located in the vicinity of the ball are displayed.

In addition, the photo of the faces of the players having the displayed uniform numbers and names are highlighted in the face photo display area 224 of the sub-display area 220.

Upon receiving an offside line display command CMD, the offside line control function unit 595 displays the offside line in the main display area 210 on the basis of the field information IFLD, the ball position information IBLP, the player position information IPLYP, and the player information IPLY.

Upon receiving a ball trajectory display command CMD, the ball trajectory control function unit 596 displays a ball trajectory in the main display area 210 on the basis of the field information IFLD, the ball position information IBLP, the player position information IPLYP, and the player information IPLY.

Note that the offside line and the ball trajectory can be displayed on the screen at the same time or can be selectively and separately displayed.

Figure 11:
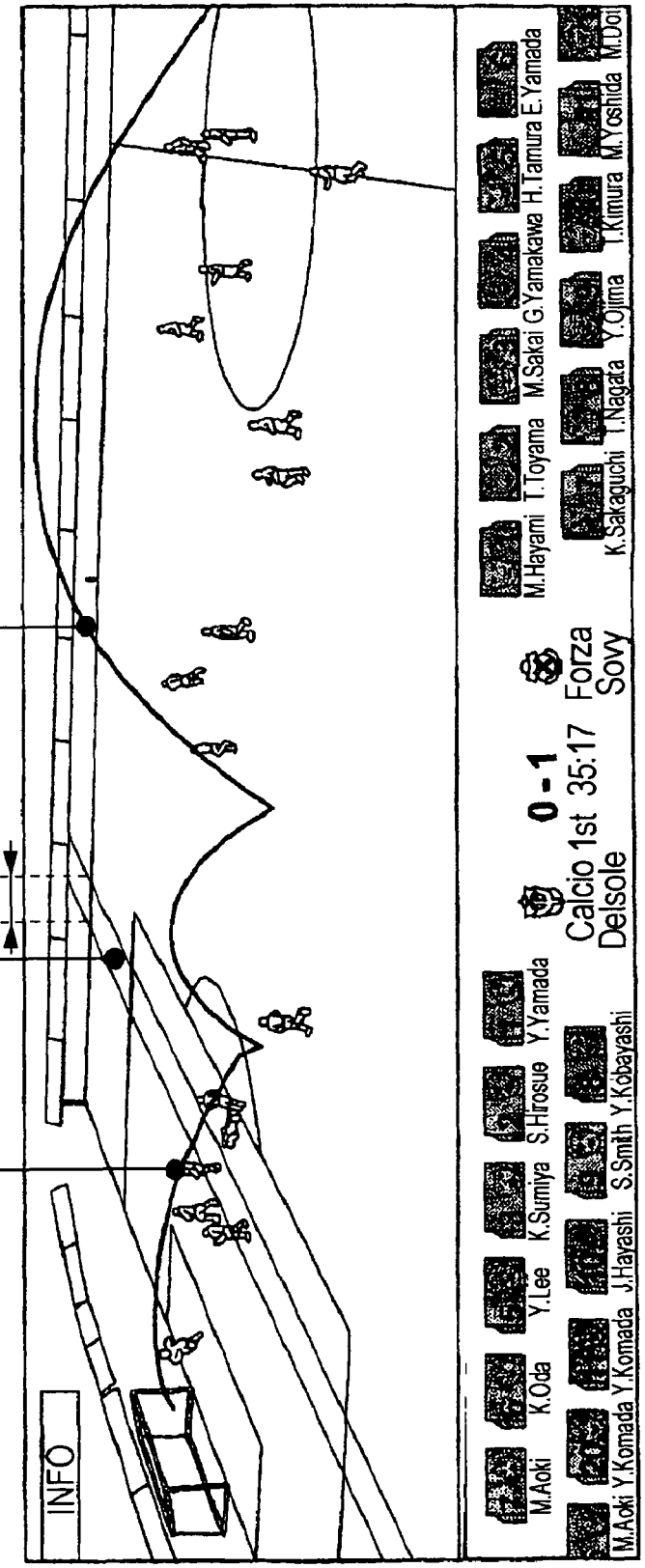
FIG. 11 is a diagram illustrating a first example in which an offside line and a ball trajectory are displayed.
Figure 12:
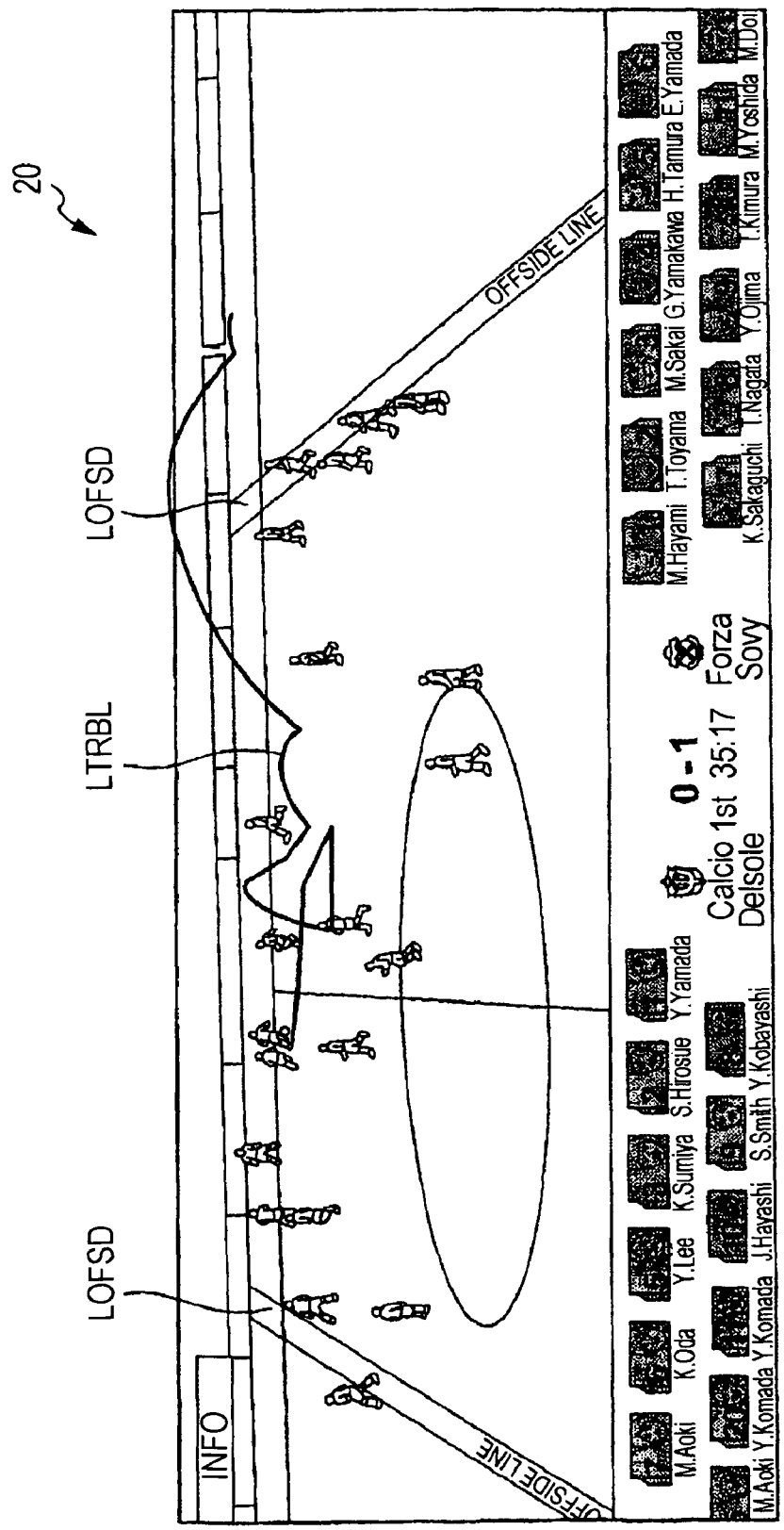
FIG. 12 is a diagram illustrating a second example in which an offside line and a ball trajectory are displayed.

FIG. 11 is a diagram illustrating a first example in which an offside line and a ball trajectory are displayed. FIG. 12 is a diagram illustrating a second example in which an offside line and a ball trajectory are displayed.

In FIGS. 11 and 12, an offside line LOFSD and a ball trajectory LTRBL are displayed in the same screen at the same time. In FIG. 11, for example, players on Team A are moving towards the goal of Team B (on offense), and only one offside line LOFSD is displayed. FIG. 12 illustrates a scene in which Team A and Team B are playing offence and defense in the midfield. Accordingly, in FIG. 12, two offside lines LOFSD are displayed.

As can be seen from FIGS. 11 and 12, the offside line LOFSD is not a thin line (a simple line), such as a field line. The offside line LOFSD has a width W that is substantially the same as the length of the stride of a player. For example, the offside line LOFSD is displayed with a semi-transparent color.

Unlike video captured by a fixed camera, TV broadcast video includes moving images obtained through panning, tilting, and zoom operations. Accordingly, if the offside line LOFSD is formed with a thin line, such as a field line, it may be difficult for the viewers to recognize the offside line LOFSD. Thus, according to the present embodiment, the offside line LOFSD has a certain width. In this way, the viewers can easily recognize the offside line LOFSD at any viewing angle and watch the soccer game with a high realistic sensation.

The recording and reproducing control function unit 597 receives the audio signal AUD from the audio decoding circuit 52 and generates an excitation graph that represents the level of excitation of onlookers along a time line of the video using the audio level of cheers.

The recording and reproducing control function unit 597 associates the generated excitation graph with time information, the player information IPLY, the player position information IPLYP, and the field information IFLD and records the excitation graph in the recording and reproducing unit 80 together with the video of the game.

The recording and reproducing control function unit 597 further has a function of, upon receiving information indicating game broadcast interruption, such as a halftime break, from the microcomputer 58, displaying the game video recorded in the recording and reproducing unit 80 together with a live image, the player information, and the excitation graph.

Figure 13:
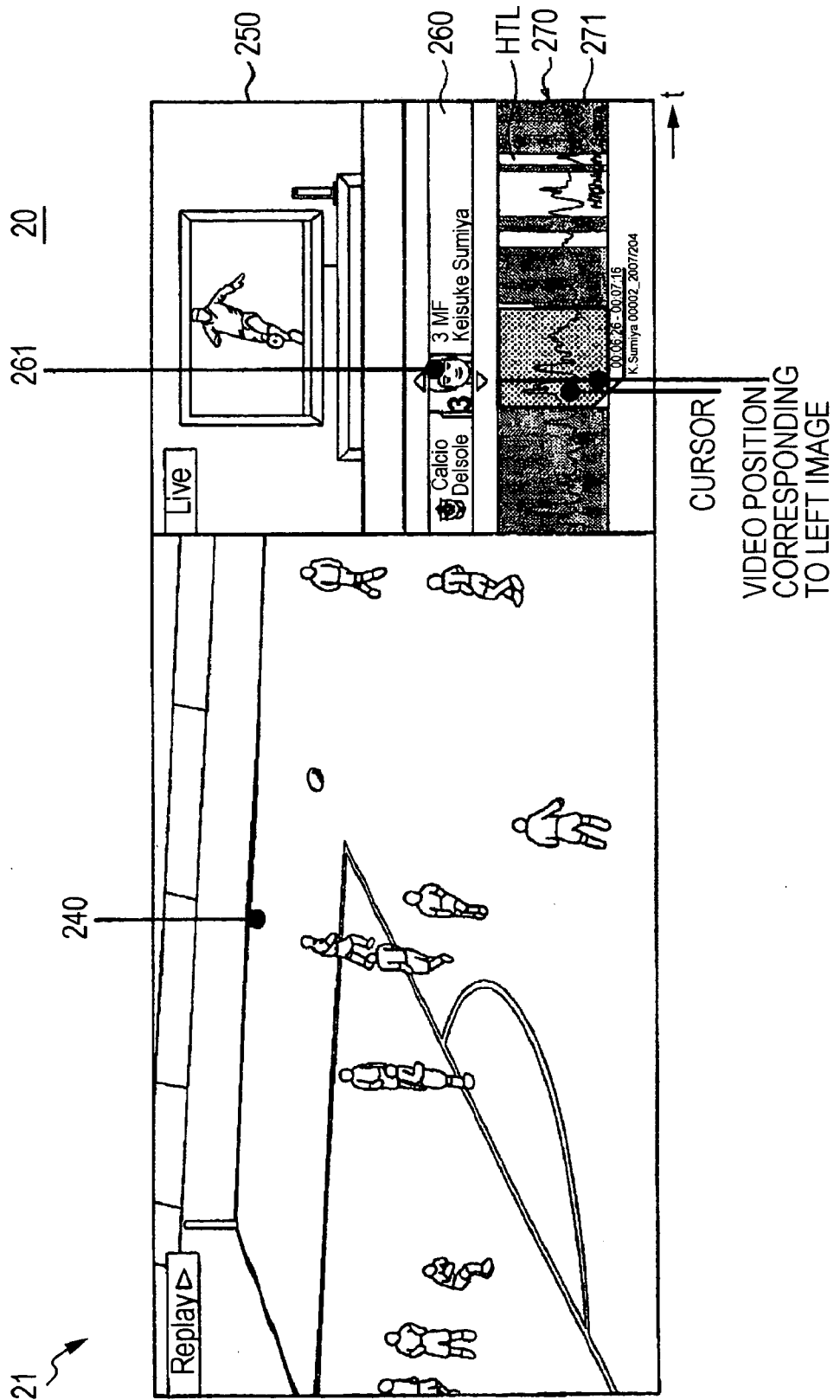
FIG. 13 illustrates an example of a screen generated by a recording and reproducing unit and displayed on the display device.

FIG. 13 illustrates an exemplary excitation video screen generated by the recording and reproducing unit 80 and displayed on the display device 20.

In order to display the excitation video screen, the recording and reproducing control function unit 597 forms, in the display area 21 of the display device 20, a video playback sub-area 240, a live image sub-area 250, a player information display sub-area 260, and an excitation graph display sub-area 270.

The excitation video screen can be displayed by displaying various video and information in the video playback sub-area 240, the live image sub-area 250, the player information display sub-area 260, and the excitation graph display sub-area 270 formed in the display area 21 of the display device 20.

The video playback sub-area 240 accounts for about 60 to 80 percent of the display area 21. The game video recorded in the recording and reproducing unit 80 is played back in the video playback sub-area 240.

For example, as shown in FIG. 13, the recording and reproducing control function unit 597 lays out the live image sub-area 250, the player information display sub-area 260, and the excitation graph display sub-area 270 on top of each other on the right side of the display area 21 so that each of the live image sub-area 250, the player information display sub-area 260, and the excitation graph display sub-area 270 is parallel to the video playback sub-area 240.

In the example shown in FIG. 13, the live image sub-area 250, the player information display sub-area 260, and the excitation graph display sub-area 270 are sequentially formed from the top to the bottom of the display area 21.

When the ongoing game broadcast is changed to a commercial (CM) video during, for example, a halftime break, the ongoing game broadcast is displayed in the live image sub-area 250. In this way, the viewers can watch the recorded video together with the live image.

The recording and reproducing control function unit 597 forms a display sub-sub area 261 for each player in the player information display sub-area 260. For example, a photo of the face of one of the players of the teams and the name of the player (Romaji representation for a Japanese player) are displayed in the display sub-sub area 261.

In the display sub-sub area 261, the photo of the face of the selected player is displayed with lighter highlighting. The team name is displayed to the left of the photo. The name and the uniform number of the player are displayed to the right of the photo.

A selected player whose information is displayed in the player information display sub-area 260 can be changed by the viewer (the user) by operating, for example, an up-down key of the remote commander 60.

The recording and reproducing control function unit 597 reads, from the recording and reproducing unit 80, an excitation graph 271 that represents the level of the excitation along the time line of the current broadcast game by using, for example, the level of cheers. Thereafter, the recording and reproducing control function unit 597 displays the excitation graph 271 in the excitation graph display sub-area 270.

The viewer can select one of predetermined periods in the time line of the excitation graph 271 by operating, for example, a left-right key of the remote commander 60. The excitation graph 271 in the selected period is highlighted with a frame.

In addition, the excitation graph 271 is displayed so as to represent the excitation level of the game in a spectrum fashion. Furthermore, for a period for which a player selected and displayed in the player information display sub-area 260 is being displayed in the game video, the excitation graph 271 is displayed with a highlight as indicated by a reference symbol "HLT".

The recording and reproducing control function unit 597 basically performs control so as to display, in the video playback sub-area 240, the recorded video corresponding to the period selected using frame highlighting in the excitation graph 271 displayed in the excitation graph display sub-area 270.

Accordingly, the user can select any player displayed in the player information display sub-area 260. Thereafter, the user can use a cursor and select a highlighted and high-excitation period of the excitation graph 271 displayed in the excitation graph display sub-area 270.

With such an operation, the user can immediately display, in the video playback sub-area 240, video corresponding to a period for which a desired player appears and the onlookers of the game are excited.

The present embodiment has been described with reference to the case in which recorded video corresponding to the period selected using a highlight frame in the excitation graph 271 displayed in the excitation graph display sub-area 270 is played back in the video playback sub-area 240. However, a method for playing back video in the video playback sub-area 240 is not limited thereto. For example, video in which a player selected in the player information display sub-area 260 appears may be displayed in the video playback sub-area 240 if desired.

As described above, according to the present embodiment, by using the control function of the recording and reproducing control function unit 597, periods in which a selected player appears is indicated by highlight frames in the spectrum along the time line. By selecting one of the periods having a high excitation level using the cursor, playback of the corresponding video can be immediately started.

The remote commander 60 has a function of wirelessly transmitting, to the microcomputer 58 of the control unit 50, a channel selection command and a variety of display control commands regarding a game using, for example, infrared light.

When the user operates the remote commander 60, an infrared light command that instructs one of a variety of operations performed by the control unit 50 serving as a TV receiver is input to the light receiving unit 70. Thereafter, the command is converted into an electrical signal and is input to the microcomputer 58.

When a command signal received from the remote commander 60 is a signal instructing selection of a particular channel, the microcomputer 58 outputs a channel selection command corresponding to the signal to the TV tuner 51.

When a command signal received from the remote commander 60 is a signal instructing display control regarding a game, the microcomputer 58 outputs a command CMD corresponding to the signal to the OSD control circuit 59.

FIGS. 14A to 14D illustrate an exemplary configuration of the remote commander 60 according to the present embodiment. FIG. 14A is a front view of the remote commander 60. FIGS. 14B and 14C are side views of the remote commander 60. FIG. 14D is a back view of the remote commander 60.

The remote commander 60 includes a power switch 61, a channel up-down switch 62, and a volume up-down switch 63.

The power switch 61 is disposed on one of the side surfaces. The power switch 61 is operated in order to power on or off the TV receiver.

The channel up-down switch 62 is operated in order to change the current TV channel to the previous TV channel or the next TV channel.

The volume up-down switch 63 is operated in order to increase or decrease the output audio level.

Note that the remote commander 60 includes number keys thereon. However, the number keys are not shown in FIGS. 14A to 14D. For example, the number keys are used to select a TV channel corresponding to the number.

The remote commander 60 further includes a four-way stick switch unit 64, a first function ON/OFF switch 65, a second function ON/OFF switch 66, a third function ON/OFF switch 67, and Team A changeover switch 68 on the back side.

The four-way stick switch unit 64 includes a peripheral ring portion 641 and a push button 642 disposed at the center of the four-way stick switch unit 64. The ring portion 641 includes four buttons that allow a four-way stick to provide four functions. For example, the lower right button can serve as a zoom function button. The four switches also function as UP, DOWN, LEFT, and RIGHT keys for moving the cursor CSL upwards, downwards, leftwards, and rightwards, respectively. Furthermore, the zoom level can be determined in accordance with an amount of pushing of the push button 642.

The first function ON/OFF switch 65 is operated in order to turn on or off the player information display function.

The second function ON/OFF switch 66 is operated in order to turn on or off the offside line display function and the ball trajectory display function.

The third function ON/OFF switch 67 is operated in order to turn on or off the live image display function, the player information display function, the excitation graph display function, and the recorded video display function.

The team changeover switch 68 is disposed on the back side of the remote commander 60 in the upper section. For example, the team changeover switch 68 is operated in order to select one of Team A and Team B which are opponents of a soccer game.

The recording and reproducing unit 80 associates the received video with the excitation graph, the time information, the player information IPLY, the player position information IPLYP, and the field information IFLD and records the video. In addition, the recording and reproducing unit 80 displays the live image and reproduces the player information IPLY and the excitation graph as well as playing back the recorded game video.

An exemplary operation performed by the display control apparatus 10 according to the present embodiment is described with reference to a flowchart shown in FIG. 15.

After a user operates the power switch 61 of the power switch 61 so as to power on the display control apparatus 10 (step ST1), the user operates the number keys or the channel up-down switch 62 so as to instruct the display control apparatus 10 to select a predetermined TV channel (step ST2).

In this way, a command signal output from the remote commander 60 is input to the microcomputer 58 via the light receiving unit 70 of the control unit 50.

Upon receiving the command signal, the microcomputer 58 outputs, to the TV tuner 51, a TV channel selection command for selecting a TV channel that broadcasts, for example, a soccer TV game. Upon receiving the TV channel selection command, the TV tuner 51 selects a predetermined TV channel. Subsequently, the TV tuner 51 outputs the audio signal to the audio decoding circuit 52 and the video signal to the video decoding circuit 53.

The video signal is decoded by the video decoding circuit 53 and is sent to the display device 20 via the superimposing circuit 54. Thus, an image based on the decoded video signal is displayed on the display device 20. In addition, the audio decoding circuit 52 decodes the audio signal and outputs the decoded audio signal to the speaker 30.

In this way, the soccer TV broadcast is displayed on the display device 20 (step ST3), and the TV audio signal is output from the speaker 30.

In addition, the video signal PCTR decoded by the video decoding circuit 53 is supplied to the player information acquiring unit 55, the field information acquiring unit 56, and the position information acquiring unit 57.

The player information acquiring unit 55 acquires the ball game information included in the broadcast video signal, such as the player information IPLY regarding players (start players and reserve players) of the two soccer teams. Thereafter, the player information acquiring unit 55 stores the player information IPLY in a storage unit (not shown) (step ST4).

The acquired and stored player information IPLY is supplied to the field information acquiring unit 56 and the OSD control circuit 59.

The field information acquiring unit 56 acquires the field information IFLD from an unedited TV broadcast video of a soccer game using a correspondence between a line in an input image and a field model. Thereafter, the field information acquiring unit 56 stores the field information IFLD (step ST5). Subsequently, the field information acquiring unit 56 supplies the acquired and stored field information IFLD to the field information acquiring unit 56 and the OSD control circuit 59.

The position information acquiring unit 57 acquires, from the video signal PCTR of the soccer TV broadcast, the position information IBLP regarding a ball located inside or outside the field using the field information IFLD and the position information IPLYP regarding each of the players on the basis of the field information IFLD and the player information IPLY (steps ST6 and ST7). Thereafter, the position information acquiring unit 57 supplies the acquired ball position information IBLP and the player position information IPLYP to the OSD control circuit 59.

In addition, the recording and reproducing control function unit 597 of the OSD control circuit 59 receives the audio signal AUD from the audio decoding circuit 52, the player information IPLY, the player position information IPLYP, the field information IFLD, and the ball position information IBLP. The recording and reproducing control function unit 597 generates an excitation graph that represents the level of excitation of onlookers along a time line of the video using the audio level of cheers (step ST8). Thereafter, the recording and reproducing control function unit 597 associates the generated excitation graph with time information, the player information IPLY, the player position information IPLYP, and the field information IFLD and records the excitation graph in the recording and reproducing unit 80 together with the video of the game (step ST9).

Figure 16:
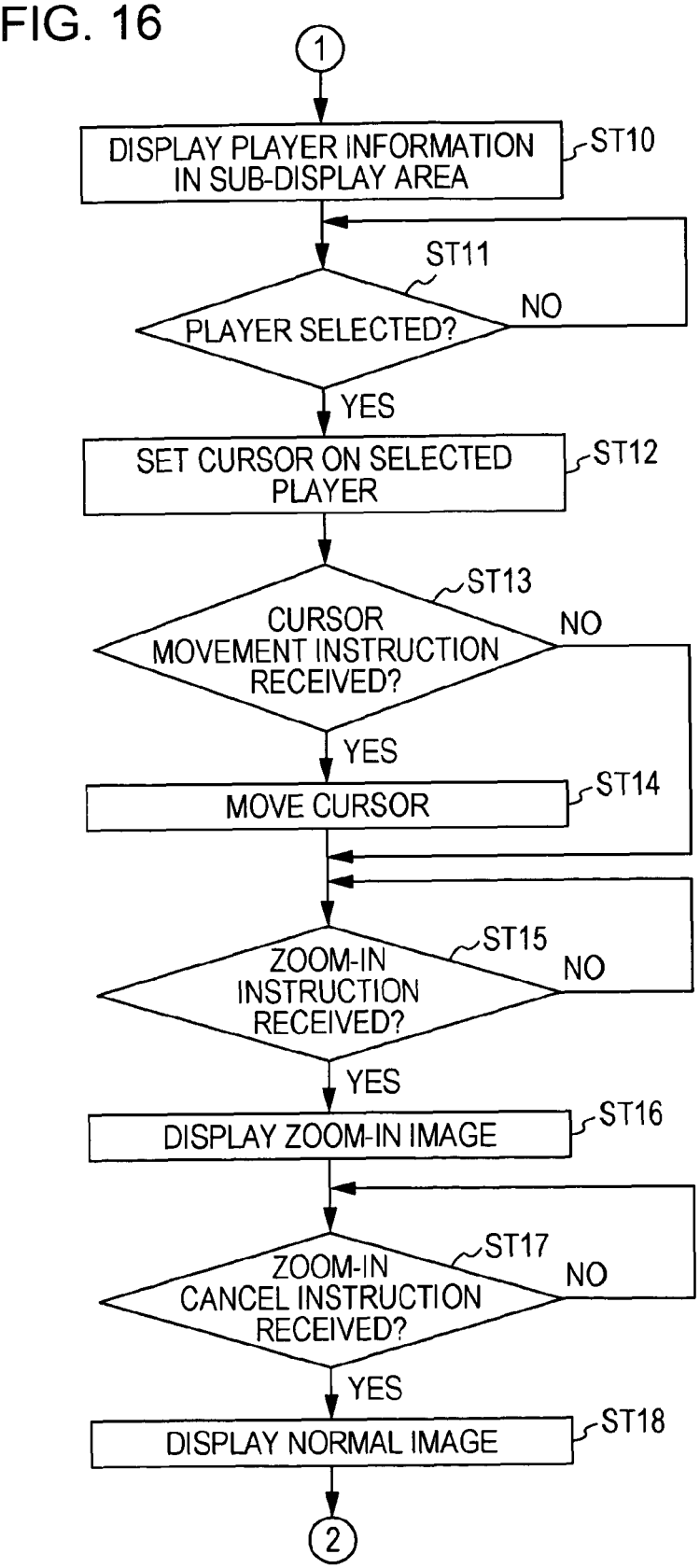
FIG. 16 is a second flowchart illustrating the operation performed by the display control apparatus according to the embodiment.

At that time, if a user who watches the soccer TV broadcast selects a favorite mode and submits a command to display player information using the remote commander 60, processing shown in FIG. 16 is performed.

Upon receiving the command, the microcomputer 58 submits a sub-display command CMD to the sub-display control function unit 591 of the OSD control circuit 59. The sub-display control function unit 591 displays a predetermined sub-area of the display area including the photos of the faces and the names of the players for each of the teams via the superimposing circuit 54 (step ST10). In such a case, for example, as shown in FIG. 5, the sub-display area 220 is formed and displayed in the lower section of a main display area 210 in a display area 21 of the display device 20. For example, the photos of the faces and the names (Romaji representation for Japanese players) of the players of each of the two teams are displayed.

When the user selects the face photo display area 224 in which a favorite player displayed in the sub-display area 220 is to be displayed using the UP, DOWN, LEFT, and RIGHT keys (step ST11), the face photo display area 224 of the favorite player is highlighted, for example.

Thereafter, for example, a particular player is selected in the sub-display area, and the OSD control circuit receives a cursor setting command CMD from the microcomputer 58.

Thus, the cursor control function unit 592 of the OSD control circuit 59 displays the cursor CSL so that the cursor CSL surrounds the player in the field displayed in the main display area 210 (step ST12).

At that time, if the user instructs to move the cursor CSL using the UP, DOWN, LEFT, and RIGHT keys of the remote commander 60, a movement command CMD is input from the microcomputer 58 to the OSD control circuit 59 (step ST13).

Upon receiving the movement command CMD from the microcomputer 58, the cursor control function unit 592 moves, using the superimposing circuit 54, the cursor CSL in a direction indicated by the movement command CMD (step ST14). The direction corresponds to one of all directions determined by a user operation of a movement instruction switch of the remote commander 60.

In addition, if the user performs a predetermined key operation on the four-way stick switch unit 64 of the remote commander 60 and instructs a zoom operation and the zoom level using the push button 642, a zoom-in command CMD is input from the microcomputer 58 to the OSD control circuit 59 (ST15).

In this way, the cursor control function unit 592 receives the zoom-in command from the microcomputer 58, and the cursor control function unit 592 zooms in the player indicated by the cursor CSL by a zoom factor indicated by the zoom-in command using the superimposing circuit 54 (step ST16).

In this case, as shown in FIG. 7, the image displayed in the main display area 210 is magnified.

Alternatively, as shown in FIG. 8, the size of a displayed image in the main display area 210 remains the same. However, the sub-display area 230 is formed on the right side of the drawing, and a zoom-in image of an area selected by the cursor CSL is displayed in the sub-display area 230.

At that time, if the user submits a zoom-in cancel instruction using the remote commander 60, a zoom-in cancel command CMD is input from the microcomputer 58 to the OSD control circuit 59 (step ST17).

Upon receiving the zoom-in cancel command CMD from the microcomputer 58, the cursor control function unit 592 changes the zoom-in display image to the normal display image (step ST18).

Figure 17:
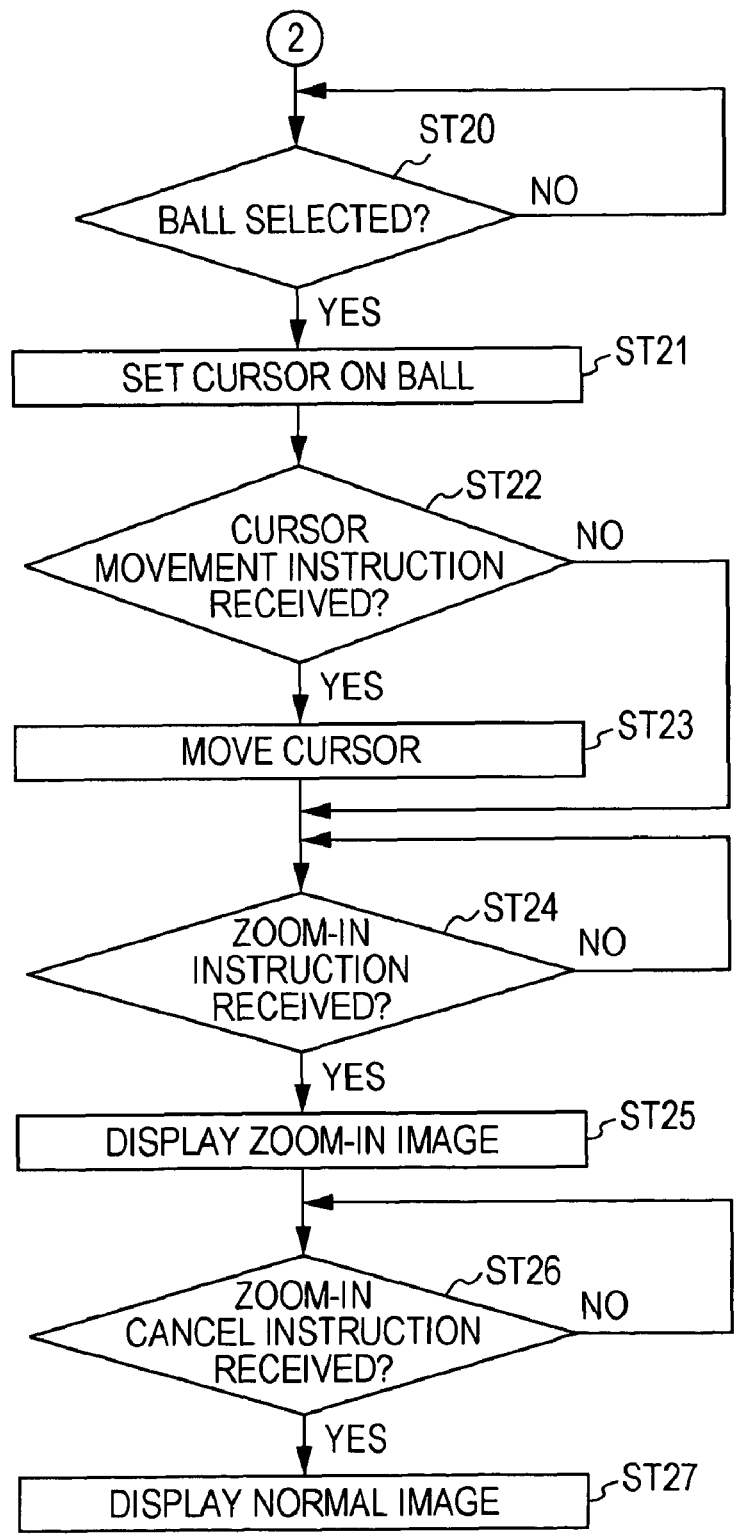
FIG. 17 is a third flowchart illustrating the operation performed by the display control apparatus according to the embodiment.

In addition, as in the case of the cursor setting on a player, when the user submits a cursor setting instruction for the ball BL, the processing as shown in FIG. 17 is performed.

When the cursor setting instruction is submitted, the OSD control circuit 59 receives a cursor setting command CMD for a ball BL from the microcomputer 58. Upon receiving the cursor setting command CMD, the cursor control function unit 592 of the OSD control circuit 59 places the cursor CSL on the ball BL displayed in the field in the main display area 210 so that the cursor CSL surrounds the ball BL (steps ST20 and ST21).

At that time, if the user instructs to move the cursor CSL using the UP, DOWN, LEFT, and RIGHT keys of the remote commander 60, a movement command CMD is input from the microcomputer 58 to the OSD control circuit 59 (step ST22).

Upon receiving the movement command CMD from the microcomputer 58, the cursor control function unit 592 moves, using the superimposing circuit 54, the cursor CSL in a direction indicated by the movement command CMD (step ST23). The direction corresponds to one of all directions determined by a user operation of a movement instruction switch of the remote commander 60.

In addition, if the user performs a predetermined key operation on the four-way stick switch unit 64 of the remote commander 60 and instructs a zoom operation and the zoom level using the push button 642, a zoom-in command CMD is input from the microcomputer 58 to the OSD control circuit 59 (ST24).

In this way, the cursor control function unit 592 receives the zoom-in command from the microcomputer 58, and the cursor control function unit 592 zooms in the ball BL indicated by the cursor CSL by a zoom factor indicated by the zoom-in command using the superimposing circuit 54 (step ST25).

In this case, as shown in FIG. 9, the image displayed in the main display area 210 is magnified.

At that time, if the user submits a zoom-in cancel instruction using the remote commander 60, a zoom-in cancel command CMD is input from the microcomputer 58 to the OSD control circuit 59 (step ST26).

Upon receiving the zoom-in cancel command CMD from the microcomputer 58, the cursor control function unit 592 changes the zoom-in display image to the normal display image (step ST27).

Figure 18:
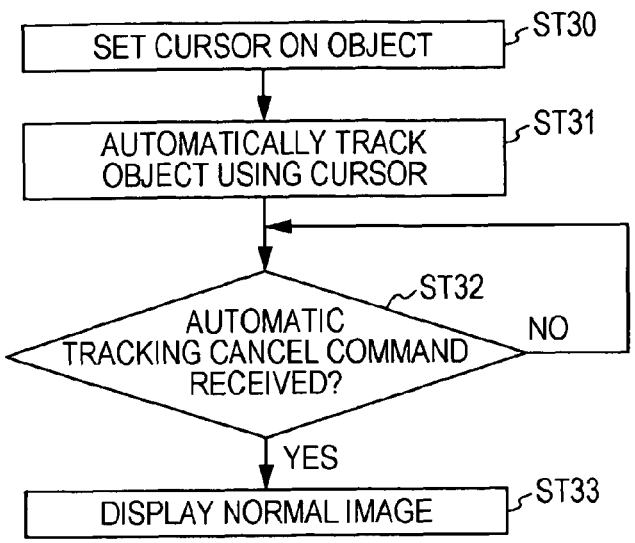
FIG. 18 is a fourth flowchart illustrating the operation performed by the display control apparatus according to the embodiment.

When, as illustrated by the flowchart in FIG. 16 or 17, a cursor is placed on a player or a ball, the automatic tracking process is started, as illustrated by the flowchart in FIG. 18.

If a player PLY or a ball BL is selected for the cursor control function unit 592 by using the cursor CSL (step ST30), the player PLY or the ball BL is automatically tracked using the tracking function of the automatic tracking control function unit 593 (step ST31). At that time, the automatic tracking control function unit 593 moves the cursor CSL so that the cursor CSL automatically follows the player PLY or the ball BL.

When the user submits an automatic tracking cancel instruction using the remote commander 60, an automatic tracking cancel command CMD is input from the microcomputer 58 to the OSD control circuit 59 (step ST32). Upon receiving the automatic tracking cancel command CMD from the microcomputer 58, the cursor control function unit 592 changes the display image to the normal display image (step ST33).

Figure 19:
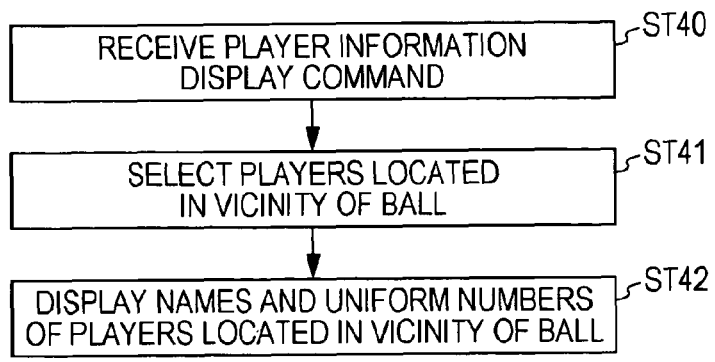
FIG. 19 is a fifth flowchart illustrating the operation performed by the display control apparatus according to the embodiment.

In addition, when the user submits a player information display instruction using the first function ON/OFF switch 65 of the remote commander 60, the processing as shown in FIG. 19 is performed.

When the player information display instruction is submitted, a player information display command CMD is input from the microcomputer 58 to the OSD control circuit 59. Upon receiving the player information display command CMD (step ST40), the player information control function unit 594 of the OSD control circuit 59 selects players located within a predetermined area, at the center of which is the ball BL, on the basis of the ball position information IBLP, the player position information IPLYP, and the player information IPLY (step ST41). Thereafter, if the player information control function unit 594 has received a command CMD containing a selected team name (Team A or Team B), the player information control function unit 594 displays the names and uniform numbers of the players in the vicinity of the heads of the players of the selected Team A or Team B located within the predetermined area, at the center of which is the ball BL (step ST42).

If the player information control function unit 594 has received a command CMD containing a selected team name (Team A or Team B), the user manually selects one of Team A and Team B. Thereafter, as shown in FIG. 10, the player information control function unit 594 displays the uniform numbers and names of the players in the vicinity of the heads of the players of the selected team located in the vicinity of the ball.

In the example shown in FIG. 10, the uniform numbers and names of players 10, 11, and 3 of Team A located in the vicinity of the ball are displayed.

In addition, the photo of the faces of the players having the displayed uniform numbers and names are highlighted in the face photo display area 224 of the sub-display area 220.

Figure 20:
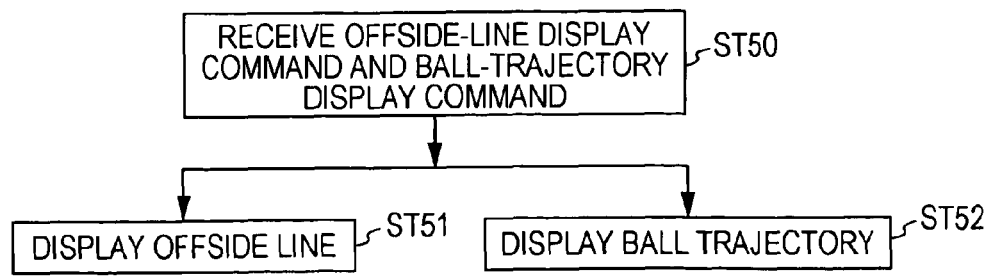
FIG. 20 is a sixth flowchart illustrating the operation performed by the display control apparatus according to the embodiment.

In addition, when the user who is watching a TV broadcast of a soccer game submits an offside-line and ball-trajectory display instruction using the second function ON/OFF switch 66 of the remote commander 60, the processing as shown in FIG. 20 is performed.

When the offside-line and ball-trajectory display instruction is submitted, the OSD control circuit 59 receives an offside-line and ball-trajectory display command CMD from the microcomputer 58 (step ST50).

The offside line control function unit 595 of the OSD control circuit 59 receives an offside-line display command CMD, while the ball trajectory control function unit 596 of the OSD control circuit 59 receives a ball-trajectory display command CMD.

Upon receiving the offside-line display command CMD, the offside line control function unit 595 displays the offside line in the main display area 210 using the superimposing circuit 54 on the basis of the field information IFLD, the ball position information IBLP, the player position information IPLYP, and the player information IPLY (step ST51).

Note that, unlike a field line which is a thin line, the offside line LOFSD is displayed so as to have a width that is substantially the same as the length of the stride of a player, for example.

In addition, upon receiving a ball trajectory display command CMD, the ball trajectory control function unit 596 displays a ball trajectory in the main display area 210 on the basis of the field information IFLD, the ball position information IBLP, the player position information IPLYP, and the player information IPLY (step ST52).

For example, as shown in FIGS. 11 and 12, the offside line LOFSD and the ball trajectory LTRBL are displayed in the same screen at the same time. In FIG. 11, for example, players on Team A are moving towards the goal of Team B (on offense), and only one offside lines LOFSD is displayed. FIG. 12 illustrates a scene in which Teams A and B are playing offence and defense in the midfield. Accordingly, in FIG. 12, two offside lines LOFSD are displayed.

Figure 21:
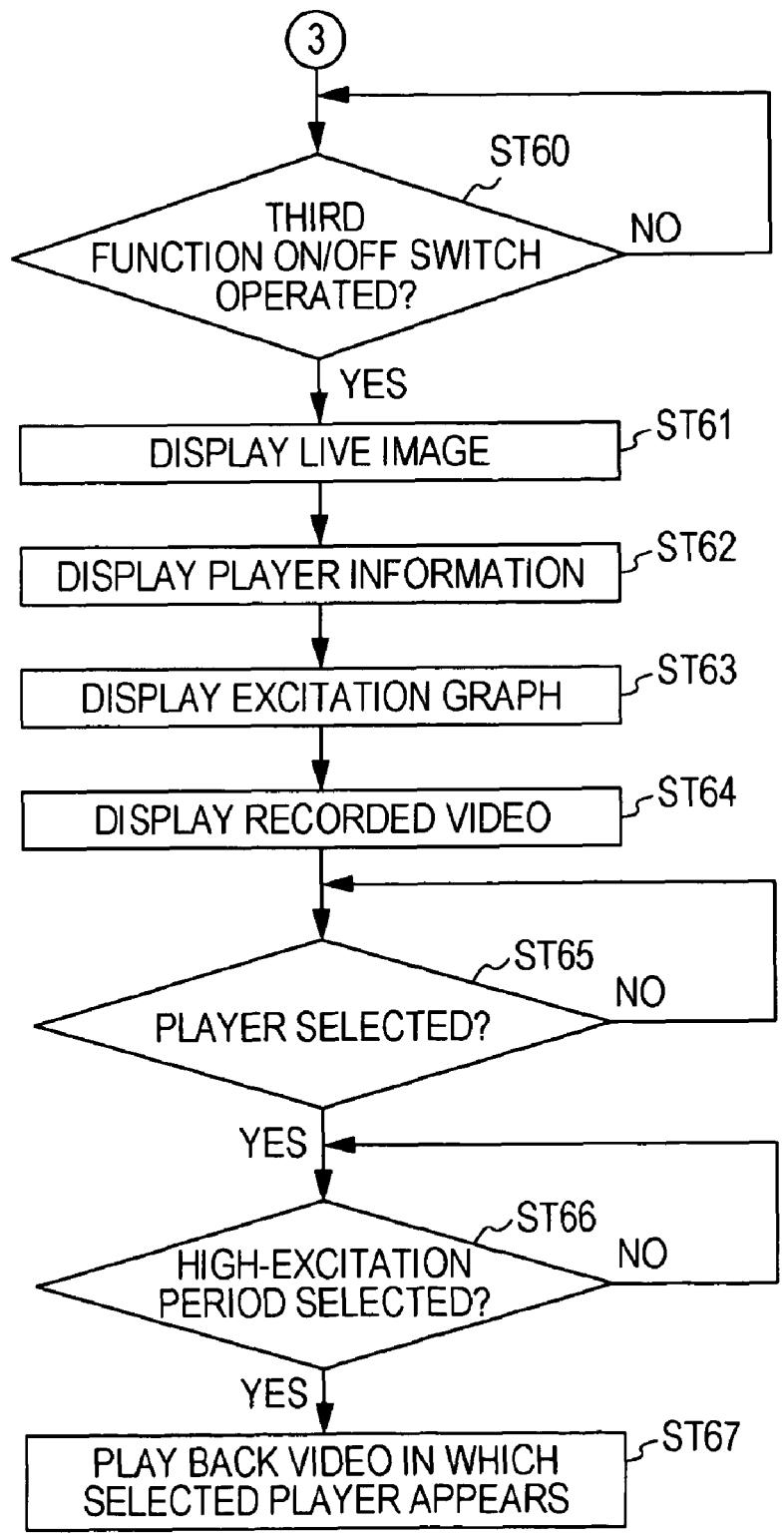
FIG. 21 is a seventh flowchart illustrating the operation performed by the display control apparatus according to the embodiment.

When the OSD control circuit 59 receives information indicating a break in the soccer TV broadcast (e.g., a halftime break) from the microcomputer 58, the processing as shown in FIG. 21 is performed.

Subsequently, as shown in FIG. 21, when the user who is watching TV broadcast of a soccer game operates the third function ON/OFF switch 67 of the remote commander 60 (step ST60), the processing shown in steps ST61 to ST67 is performed.

At that time, as shown in FIG. 13, the recording and reproducing control function unit 597 forms, in the display area 21 of the display device 20, the video playback sub-area 240, the live image sub-area 250, the player information display sub-area 260, and the excitation graph display sub-area 270.

Thereafter, the recording and reproducing control function unit 597 displays the live image, the player information, and the excitation graph together with the video of the game recorded in the recording and reproducing unit 80 (steps ST61 to ST64).

When the ongoing game broadcast is changed to a commercial (CM) video during, for example, a halftime break, the current broad cast video is displayed in the live image sub-area 250.

The recording and reproducing control function unit 597 forms a display sub-sub area 261 for each player in the player information display sub-area 260. For example, a photo of the face of one of the players of the teams and the name of the player (Romaji representation for a Japanese player) are displayed in the display sub-sub area 261.

In the display sub-sub area 261, the photo of the face of the selected player is displayed with lighter highlighting. The team name is displayed to the left of the photo. The name and the uniform number of the player are displayed to the right of the photo.

The recording and reproducing control function unit 597 reads, from the recording and reproducing unit 80, an excitation graph 271 that represents the level of the excitation along the time line of the current broadcast game by using, for example, the level of cheers. Thereafter, the recording and reproducing control function unit 597 displays the excitation graph 271 in the excitation graph display sub-area 270.

In addition, for a period for which a player selected and displayed in the player information display sub-area 260 is being displayed in the TV broadcast video, the excitation graph 271 is displayed with a highlight as indicated by a reference symbol "HLT".

At that time, the user selects a desired player to be displayed in the playback video using the UP/DOWN keys of the remote commander 60 (step ST65). Thereafter, the user operates the RIGHT/LEFT keys of the remote commander 60 and selects a highlighted and high-excitation period of the excitation graph 271 for which the selected player appears (step ST66).

Upon receiving the selection command, the recording and reproducing control function unit 597 displays the recorded video corresponding to the selected period in the video playback sub-area 240 (step ST67). Note that the selected period is highlighted with a frame in the excitation graph 271 displayed in the excitation graph display sub-area 270 and, during the period, the selected player appears in the video.

With such an operation, the user can immediately display, in the video playback sub-area 240, video corresponding to a period for which a desired player appears and the onlookers of the game are excited.

As described above, according to the present embodiment, the control unit 50 provides the following various functions.

That is, the control unit 50 has a function of acquiring, from broadcast video information, player information regarding a player of a game included in a broadcast video signal, for example, a soccer game. The control unit 50 further has a function of acquiring field information using a correspondence between a line in the broadcast video and a field model.

Furthermore, the control unit 50 has a function of acquiring player position information regarding a player's position from the video signal on the basis of the player information and the field information. Still furthermore, the control unit 50 has a function of acquiring information regarding the position of a ball serving as a moving object to be propelled in the game from the video signal on the basis of the field information and a function of displaying the player information on the display device 20.

In this case, the control unit 50 has a function of arranging a plurality of player information items and displaying the player information items in part of the display area of the display device 20. In addition, the control unit can display the player information for each team. The control unit 50 can display a player information item indicated by a cursor in a different way from the other player information items (e.g., highlight display).

Furthermore, the control unit 50 has a function of placing a cursor on a player selected by provided player information and displayed on the display device 20 using the player position information.

Still furthermore, the control unit 50 has a function of placing a cursor on a ball that is selected to be indicated by the cursor.

Yet still furthermore, the control unit 50 has a function of, upon receiving an instruction to display player information, displaying the player information in the vicinity of the player on the basis of the ball position information, the player position information, and the player information. At that time, the control unit 50 can display the player information in the vicinity of each of the players located in a predetermined area, at the center of which is the ball. If one of the teams is selected, the control unit 50 can display the player information regarding the selected team.

Still furthermore, the control unit 50 has a function of, after a cursor is placed on an object, such as a player or a ball, automatically tracking the object when the object moves. Upon receiving a zoom instruction, the control unit 50 including an auto tracking control function sub-unit can enlarge and display at least the area indicated by the cursor.

That is, according to the present embodiment, when the user watches TV broadcast video, the user can acquire video including desired additional information.

In addition, if the user selects a desired player in the player information selection screen, a cursor is automatically set on the object. If the cursor is set on a player or a ball, the player or the ball can be automatically tracked or can be zoomed in.

Accordingly, the user can select and display desired additional information with an easy operation.

Yet still furthermore, the control unit 50 has a function of forming a line associated with the ball position, such as an offside line of soccer or a trajectory of the ball, using the ball position information, the player position information, the player information, and the field information. At that time, the control unit 50 has a function of forming an offside line having a predetermined width, not a simple line.

Accordingly, the viewers can easily recognize the offside line at any viewing angle and watch the soccer game with a high realistic sensation.

Yet still furthermore, the control unit 50 has a function of receiving the audio signal in the television broadcast signal and creating an excitation graph indicating an excitation level of the broadcast game with respect to a time line of the broadcast video. The control unit 50 has a function of associating the created excitation graph with time information and the player information and recording the excitation graph in the recording and reproducing unit 80 together with the video of the game.

The control unit 50 has a function of, upon receiving information indicating game interruption, such as a halftime break, instructing the display device 20 to display a live image, the player information, and the excitation graph together with the video of the game recorded in the recording and reproducing unit 80.

The control unit 50 has a function of selectively displaying the excitation graph for each of predetermined periods of time in the time line or selectively displaying the player information items. Upon receiving an instruction to select the periods in which a selected and displayed player appears in the broadcast video, the control unit 50 plays back and displays the recorded video for the selected periods.

In this way, according to the present embodiment, periods in which a selected player appears is indicated by highlight in the spectrum along the time line. In addition, periods of a high-excitation scene can be identified by the spectrum. By selecting, using the cursor, one of the periods that have a high excitation level and in which the selected player appears, playback of the video corresponding to the period can be immediately started.

While the present embodiment has been described with reference to a soccer game, the present invention can be applied to other games, such as rugby games and hockey games. In addition, the control function of the recording and reproducing control function unit 597 is applicable to video of a mass game and a theater play as well as a game using a moving object, such as a ball.

In addition, the above-described method can be provided as a program that represents the above-described processing sequence and that is executed by a computer, such as a central processing unit (CPU).

Furthermore, such a program can be configured so as to be stored in a recording medium (e.g., a semiconductor memory, a magnetic disk, an optical disk, or a floppy disk (trade name)) and be accessed and executed by a computer including the recording medium mounted therein.

It should be understood by those skilled in the art that various modifications, combinations, sub-combinations and alterations may occur depending on design requirements and other factors insofar as they are within the scope of the appended claims or the equivalents thereof.

What is claimed is:

1. A display control apparatus comprising:
   a receiving unit configured to receive a television broadcast signal containing at least remote broadcast image information;
   a display unit configured to display image information contained in the television broadcast signal;
   a player information acquiring unit configured to acquire, from the remote broadcast image information, information regarding players in a sports game included in a broadcast image signal;
   a field information acquiring unit configured to acquire field information from the remote broadcast image information;
   a player position information acquiring unit configured to acquire player position information from the image signal on the basis of the player information and the field information;
   a player information providing unit configured to provide the player information acquired by the player information acquiring unit by displaying the player information on the display unit; and
   a cursor control function unit configured to set, using the player position information, a cursor on one of the players selected using the player information provided by the player information providing unit and displayed on the display unit, wherein when the cursor control function unit receives a movement command after setting the cursor on the player, the cursor control function unit moves the cursor in a direction indicated by the movement command, the direction corresponding to one of all directions determined by a user operation of a movement instruction switch of a remote commander.

2. The display control apparatus according to claim 1, further comprising:
   a moving object position information acquiring unit configured to acquire position information regarding a position of a moving object to be propelled in the sports game from the image signal on the basis of the field information;
   wherein the cursor control function unit sets the cursor on the moving object to be propelled in the sports game when instructed to set the cursor on the moving object.

3. The display control apparatus according to claim 2, further comprising:
   a player information control function unit configured to, upon receiving a player information display instruction, display the player information in the vicinity of the player on the basis of the position information regarding a position of a moving object to be propelled in the sports game, the player position information, and the player information.

4. The display control apparatus according to claim 3, wherein the player information control function unit displays the player information regarding the player located within a predetermined area, at the center of which is the moving object to be propelled in the sports game, in the vicinity of the player.

5. The display control apparatus according to claim 3, wherein, if a team is selected, the player information control function unit displays the player information regarding the players of the selected team.

6. The display control apparatus according to any one of claims 1, further comprising:
   an automatic tracking control function unit configured to, when the cursor is set on an object to be set by the cursor control function unit, cause the cursor to automatically track the object in accordance with movement of the object.

7. The display control apparatus according to claim 1, wherein, upon receiving a zoom-in instruction, the cursor control function unit zooms in and displays at least an area indicated by the cursor.

8. The display control apparatus according to claim 1, wherein the player information providing unit arranges and displays a plurality of the player information items in part of an entire display area of the display unit.

9. The display control apparatus according to claim 8, wherein the player information providing unit displays the player information separately for each of the teams.

10. The display control apparatus according to claim 8, wherein the player information providing unit displays the player information regarding the player having the cursor set thereon in a format different from that for the other players.

11. A display control method comprising the steps of:
receiving a television broadcast signal containing at least remote broadcast image information;
displaying image information contained in the television broadcast signal on a display unit;
acquiring, from the remote broadcast image information, information regarding players in a sports game included in a broadcast image signal;
acquiring field information from the remote broadcast image information;
acquiring player position information from the image signal on the basis of the player information and the field information;
providing the player information acquired by the player information acquiring unit by displaying the player information on the display unit; and
setting, using the player position information, a cursor on one of the players selected using the provided player information and displayed on the display unit, wherein when a movement command is received after setting the cursor on the player, the cursor is moved in a direction indicated by the movement command, the direction corresponding to one of all directions determined by a user operation of a movement instruction switch of a remote commander.

12. A non-transitory computer-readable medium having stored thereon a computer-readable program comprising:
program code for causing a computer to execute a display control process, the display control process including the steps of receiving a television broadcast signal containing at least remote broadcast image information, displaying image information contained in the television broadcast signal on a display unit, acquiring, from the remote broadcast image information, information regarding players in a sports game included in a broadcast image signal, acquiring field information from the remote broadcast image information, acquiring player position information from the image signal on the basis of the player information and the field information, providing the player information acquired by the player information acquiring unit by displaying the player information on the display unit, and setting, using the player position information, a cursor on one of the players selected using the provided player information and displayed on the display unit, wherein when a movement command is received after setting the cursor on the player, the cursor is moved in a direction indicated by the movement command, the direction corresponding to one of all directions determined by a user operation of a movement instruction switch of a remote commander.

* * * * *